(12) United States Patent
Bergstra et al.

(10) Patent No.: US 10,994,417 B2
(45) Date of Patent: *May 4, 2021

(54) SYSTEMS, DEVICES, AND METHODS FOR THE DISTRIBUTION AND COLLECTION OF MULTIMODAL DATA ASSOCIATED WITH ROBOTS

(71) Applicant: Kindred Systems Inc., San Francisco, CA (US)

(72) Inventors: James Sterling Bergstra, Toronto (CA); Suzanne Gildert, Burnaby (CA); George Samuel Rose, Vancouver (CA)

(73) Assignee: Kindred Systems Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,736

(22) Filed: Oct. 4, 2019

(65) Prior Publication Data

US 2020/0030974 A1 Jan. 30, 2020

Related U.S. Application Data

(63) Continuation of application No. 15/365,527, filed on Nov. 30, 2016, now Pat. No. 10,471,594.

(60) Provisional application No. 62/261,602, filed on Dec. 1, 2015.

(51) Int. Cl.
*B25J 9/16* (2006.01)

(52) U.S. Cl.
CPC ... *B25J 9/1656* (2013.01); *G05B 2219/39354* (2013.01); *G05B 2219/40405* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 4,638,445 A | * | 1/1987 | Mattaboni | B25J 19/021 701/23 |
| 5,121,497 A | * | 6/1992 | Kerr | G06F 13/107 719/328 |
| 5,579,444 A | * | 11/1996 | Dalziel | B25J 9/1669 382/153 |
| 5,672,060 A | * | 9/1997 | Poor | G09B 7/02 382/321 |
| 5,690,497 A | * | 11/1997 | Clark | G09B 7/00 434/118 |

(Continued)

OTHER PUBLICATIONS

Bethel et al., "Survey of Psychophysiology Measurements Applied to Human-Robot Interaction," *The 16th IEEE International Symposium on Robot and Human interactive Communication*, Aug. 26-29, Jeju, South Korea, 2007, 6 pages.

(Continued)

*Primary Examiner* — Jonathan L Sample
(74) *Attorney, Agent, or Firm* — Seed IP Law Group LLP

(57) ABSTRACT

A dynamic representation of a robot in an environment is produced, one or more observer agent collects data, and respective values of one or more metrics for the robot are computed based at least in part on the collected data. Tasks for the robot to perform are generated. Ratings and challenge questions are generated. A server may produce a user interface and a value of a metric based on collected observer data.

20 Claims, 14 Drawing Sheets

(56) References Cited

U.S. PATENT DOCUMENTS

| | | | | |
|---|---|---|---|---|
| 5,719,480 A * | 2/1998 | Bock | B25J 9/163 | 318/561 |
| 5,994,864 A * | 11/1999 | Inoue | B25J 9/1633 | 318/568.2 |
| 6,169,981 B1 * | 1/2001 | Werbos | G05B 13/0265 | 706/23 |
| 6,751,351 B2 * | 6/2004 | Knowles | G09B 7/02 | 382/181 |
| 6,961,060 B1 * | 11/2005 | Mochizuki | A63F 13/12 | 345/473 |
| 7,835,820 B2 * | 11/2010 | Peters, II | G05D 1/0246 | 700/245 |
| 8,419,804 B2 * | 4/2013 | Herr | B25J 9/0006 | 623/24 |
| 8,924,021 B2 * | 12/2014 | Dariush | G06N 3/008 | 700/262 |
| 8,958,912 B2 * | 2/2015 | Blumberg | B25J 9/0087 | 700/259 |
| 9,144,907 B2 * | 9/2015 | Summer | B25J 9/1692 | 700/261 |
| 9,186,793 B1 * | 11/2015 | Meier | B60K 11/02 | |
| 9,314,924 B1 * | 4/2016 | Laurent | G06N 3/049 | |
| 9,393,693 B1 * | 7/2016 | Kalakrishnan | B25J 9/1602 | |
| 9,802,322 B2 * | 10/2017 | Angle | H04L 12/2809 | |
| 9,811,074 B1 * | 11/2017 | Aichele | G06N 7/04 | |
| 10,105,841 B1 * | 10/2018 | Szatmary | G06N 3/008 | |
| 10,168,699 B1 * | 1/2019 | Theobald | G05D 1/0088 | |
| 2003/0108415 A1 * | 6/2003 | Hosek | B25J 9/1664 | 414/783 |
| 2003/0220714 A1 * | 11/2003 | Nakamura | B25J 9/1633 | 700/245 |
| 2004/0030449 A1 * | 2/2004 | Solomon | H04B 7/18517 | 700/245 |
| 2004/0167641 A1 * | 8/2004 | Kawai | B25J 9/0006 | 700/63 |
| 2004/0172168 A1 * | 9/2004 | Watanabe | B25J 9/1664 | 700/264 |
| 2004/0267404 A1 * | 12/2004 | Danko | E02F 3/438 | 700/245 |
| 2005/0054381 A1 * | 3/2005 | Lee | H04M 1/72586 | 455/557 |
| 2006/0207419 A1 * | 9/2006 | Okazaki | B25J 9/142 | 91/35 |
| 2006/0250101 A1 * | 11/2006 | Khatib | B25J 9/1633 | 318/568.2 |
| 2006/0276934 A1 * | 12/2006 | Nihei | B25J 9/1679 | 700/245 |
| 2007/0021867 A1 * | 1/2007 | Woo | H04L 12/282 | 700/245 |
| 2007/0074177 A1 * | 3/2007 | Kurita | G06F 8/75 | 717/131 |
| 2007/0151389 A1 * | 7/2007 | Prisco | A61B 34/70 | 74/490.05 |
| 2007/0200525 A1 * | 8/2007 | Kanaoka | G05D 1/0875 | 318/568.21 |
| 2007/0255454 A1 * | 11/2007 | Dariush | G06N 3/008 | 700/245 |
| 2008/0114710 A1 * | 5/2008 | Pucher | G06N 20/00 | 706/20 |
| 2008/0140257 A1 * | 6/2008 | Sato | B25J 9/1638 | 700/258 |
| 2008/0319929 A1 * | 12/2008 | Kaplan | G06N 3/004 | 706/14 |
| 2009/0272585 A1 * | 11/2009 | Nagasaka | B25J 9/1633 | 180/8.6 |
| 2010/0152896 A1 * | 6/2010 | Komatsu | B25J 13/085 | 700/258 |
| 2010/0152899 A1 * | 6/2010 | Chang | B25J 9/1682 | 700/262 |
| 2010/0305758 A1 * | 12/2010 | Nishi | G05B 19/41825 | 700/264 |
| 2011/0020779 A1 * | 1/2011 | Hannaford | A61B 34/30 | 434/262 |
| 2011/0060460 A1 * | 3/2011 | Oga | B25J 9/1633 | 700/254 |
| 2011/0067479 A1 * | 3/2011 | Davis | B25J 9/1692 | 73/1.75 |
| 2011/0160906 A1 * | 6/2011 | Orita | B62D 57/032 | 700/260 |
| 2011/0160907 A1 * | 6/2011 | Orita | B25J 9/1607 | 700/260 |
| 2011/0218676 A1 * | 9/2011 | Okazaki | B25J 9/1633 | 700/260 |
| 2012/0144242 A1 * | 6/2012 | Vichare | G06F 11/0751 | 714/39 |
| 2012/0150777 A1 * | 6/2012 | Setoguchi | G06F 16/24575 | 706/14 |
| 2012/0197439 A1 * | 8/2012 | Wang | G05D 1/0038 | 700/259 |
| 2013/0000480 A1 * | 1/2013 | Komatsu | B25J 9/142 | 92/48 |
| 2013/0078600 A1 * | 3/2013 | Fischer | G09B 19/00 | 434/236 |
| 2013/0173060 A1 * | 7/2013 | Yoo | B25J 9/0006 | 700/261 |
| 2013/0245829 A1 * | 9/2013 | Ohta | B25J 9/1641 | 700/261 |
| 2013/0343640 A1 * | 12/2013 | Buehler | B25J 9/1697 | 382/155 |
| 2014/0012415 A1 * | 1/2014 | Benaim | G06F 30/00 | 700/248 |
| 2014/0114479 A1 * | 4/2014 | Okazaki | B25J 9/1651 | 700/253 |
| 2014/0207282 A1 * | 7/2014 | Angle | H04L 67/125 | 700/257 |
| 2014/0371907 A1 * | 12/2014 | Passot | G06N 3/008 | 700/257 |
| 2015/0217449 A1 * | 8/2015 | Meier | G05B 13/027 | 700/257 |
| 2015/0290795 A1 * | 10/2015 | Oleynik | G05B 19/42 | 700/257 |
| 2015/0367513 A1 * | 12/2015 | Gettings | B25J 9/0084 | 700/248 |
| 2016/0059412 A1 * | 3/2016 | Oleynik | B62D 57/032 | 700/257 |
| 2016/0114418 A1 * | 4/2016 | Jones | B23K 9/1274 | 219/124.1 |
| 2016/0114488 A1 * | 4/2016 | Mascorro Medina | B25J 11/008 | 700/259 |
| 2016/0151918 A1 * | 6/2016 | Stoyanchev | G06F 40/30 | 700/246 |
| 2016/0158942 A1 * | 6/2016 | Augenbraun | B25J 9/1694 | 700/253 |
| 2016/0243701 A1 * | 8/2016 | Gildert | G05B 19/42 | |
| 2017/0066128 A1 * | 3/2017 | Gildert | B25J 9/1679 | |

OTHER PUBLICATIONS

Duffy, "Anthropomorphism and the social robot," *Robotics and Autonomous Systems* 42:177-190, 2003.

Fong et al., "A Survey of Socially Interactive Robots: Concepts, Design, and Applications," Technical Report CMU-RI-TR-02-29, The Robotics Institute, Carnegie Mellon University, 2002, 58 pages.

Harrison, "Measuring and Comparing Human Walking Motions for Computer Animation," Doctoral Thesis, University of British Columbia, 2001, 405 pages.

Howe, "The Rise of Crowdsourcing," *Wired Magazine* 14(6): 2006, 5 pages.

Jaimes et al., "Multimodal human—computer interaction: A survey," *Computer Vision and Image Understanding* 108:116-134, 2007.

Kahn et al., "What is a Human?—Toward Psychological Benchmarks in the Field of Human-Robot Interaction," *The 15th IEEE International Symposium on Robot and Human Interactive Communication*, Sep. 6-8, Hatfield, UK, 2006, pp. 364-371.

(56) References Cited

OTHER PUBLICATIONS

Steinfeld et al., "Common Metrics for Human-Robot Interaction," *2006 Conference on Human-Robot Interaction*, Mar. 2-6, Salt Lake City, UT, 2006, 9 pages.
Turing, "Computing Machinery and Intelligence," *Mind* 59(236):433-460, 1950.
Von Ahn et al., "reCAPTCHA: Human-Based Character Recognition via Web Security Measures," *Science* 321:1465-1468, 2008.

\* cited by examiner

SYSTEMS, DEVICES, AND METHODS FOR THE DISTRIBUTION AND COLLECTION OF MULTIMODAL DATA ASSOCIATED WITH ROBOTS

BACKGROUND

Technical Field

This disclosure generally relates to the field(s) of machine learning, data collection, automated classification, distributed computation, and/or operation of robots.

Description of the Related Art

Machine Learning

A computer, which is a machine, can perform or succeed at one or more related tasks as defined by a measure. The computer learns if after exposure to information characterizing an event the computer improves under the measure at performing the one or more related tasks. Further, the computer learns without updates to any processor-executable instructions by imperative programming.

Robots

Robots are systems, machines, or devices that are capable of carrying out one or more tasks. A robot is an electro-mechanical machine controlled by circuitry and/or a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled. As well, a robot includes computational resources to preform computational tasks. The computational tasks can be in aid of the physical tasks.

BRIEF SUMMARY

A method of operation in a computing system, including a robot, may be summarized as including: providing, by a processor, a dynamic representation of a robot in an environment; causing, by the processor, the robot to start in a scenario; collecting data from at least one observer agent; computing, by the processor, a value of a metric for the robot based on the collected data; and returning, by the processor, the value of the metric.

The method of operation in a computing system, including a robot, may further include generating, by the processor, a multimedia representation of the robot in the environment.

The method of operation in a computing system, including a robot, may further include storing, by the processor, the value of the metric.

The method of operation in a computing system, including a robot, may further include: defining, by the processor, a task for the robot to perform; and causing, by the processor, the robot to start at the task.

Collecting data from the at least one observer agent may include receiving, by the processor, information that represents one or more ratings provided by a first observer agent within the at least one observer agent at an observer interface. Collecting data from the at least one observer agent may include receiving, by the processor, one or more ratings from an automated classification computing system. Collecting data from the at least one observer agent may include generating, by the processor, a challenge question for the at least one observer agent.

The method of operation in a computing system, including a robot, may further include distributing, by the processor, an observer interface for the at least one observer agent.

The method of operation in a computing system, including a robot, may further include generating, by the processor, the observer interface for the at least one observer agent.

Collecting data from at least one observer agent may include receiving, by the processor, a first portion of data associated with the metric from the at least one observer agent via the observer interface. Collecting data from at least one observer agent may include receiving, by the processor, at least one time series from the at least one observer agent via the observer interface.

The method of operation in a computing system, including a robot, may further include receiving, by the processor, at least categorical data from the at least one observer agent via the observer interface.

The method of operation in a computing system, including a robot, may further include receiving, via a network, information that represents robot instructions created at an operator interface.

Computing the value for the metric for the robot based on the collected data may include: aggregating, by the processor, data from a plurality observer agents, wherein the plurality of observer agents includes the at least one observer agent; and determining, by the processor, the metric from the aggregated data.

The method of operation in a computing system, including a robot, may further include: stopping, by the processor, autonomous control of the robot; and causing, by the processor, the robot to restart under user control.

The method of operation in a computing system, including a robot, may further include: stopping user control of the robot; and causing, by the processor, the robot to restart under autonomous control.

The method of operation in a computing system, including a robot, may further include receiving, by the processor, information that represents a control history of the robot over the first period.

A robotic system may be summarized as including: at least one processor; a robot coupled to the at least one processor; and at least one non-transitory computer-readable storage media coupled to the first processor, and which stores processor-executable instructions thereon which when executed causes the at least one processor to: provide a dynamic representation of the robot in an environment; cause the robot to start in a scenario; collect data from at least one observer agent; and compute, a value of a metric for the robot based on the collected data from the at least one observer agent.

The robotic system may further include an operator interface coupled to the at least one processor, and the robot, via a communication channel.

When executed, the processor-executable instructions may further cause the at least one processor to receive information that represents robot instructions created at the operator interface.

The robotic system may further include a camera coupled to the at least one processor.

When executed, the processor-executable instructions may further cause the at least one processor to generate via the camera a multimedia representation of the robot in the environment. When executed, the processor-executable instructions may further cause the at least one processor to store the value of the metric. When executed, the processor-executable instructions may further cause the at least one processor to: define a task for the robot to perform; and cause the robot to start the task. When executed, the processor-executable instructions may further cause the at least one processor to receive information that represents one or more ratings provided by a first observer agent within the at least one observer agent at an observer interface.

The robotic system may further include: an automated classification computing system; and wherein, when executed, the processor-executable instructions may further cause the at least one processor to receive one or more ratings from the automated classification computing system.

When executed, the processor-executable instructions may further cause the at least one processor to generate a challenge question for the at least one observer agent. When executed, the processor-executable instructions may further cause the at least one processor to distribute observer interface processor executable instructions which when executed by another processor generates an observer interface for the at least one observer agent. When executed, the processor-executable instructions may further cause the at least one processor to generate the observer interface processor executable instructions which when executed by the other processor may generate the observer interface for the at least one observer agent. When executed, the processor-executable instructions may further cause the at least one processor to receive a first portion of data associated with the metric from the at least one observer agent via the observer interface. When executed, the processor-executable instructions may further cause the at least one processor to receive at least one time series from the at least one observer agent via the observer interface. When executed, the processor-executable instructions may further cause the at least one processor to receive at least categorical data from the at least one observer agent via the observer interface. When executed, the processor-executable instructions may further cause the at least one processor to: aggregate data from a plurality observer agents, wherein the plurality of observer agents may include the at least one observer agent; and determine the metric from the aggregated data. When executed, the processor-executable instructions may further cause the at least one processor to: stop autonomous control of the robot; and cause the robot to restart under user control. When executed, the processor-executable instructions may further cause the at least one processor to: stop user control of the robot; and cause the robot to restart under autonomous control. When executed, the processor-executable instructions may further cause the at least one processor to receive information representing a control history of the robot over the first period.

A method of operation in a robotic system, the robotic system including server and a robot, may be summarized as including: receiving, at the server, a request to produce a value for a metric for the robot over a first period; receiving, at the server, information representing a control history of the robot over the first period; receiving, at the server, information specifying a dynamic representation of the robot in an environment over the first period, wherein the dynamic representation depicts the robot within a scenario; generating, at the server, an observer interface to be presented to at least one observer agent; distributing, from the server, the observer interface to the at least one observer agent; collecting, at the server, observer data from the at least one observer agent; computing, at the server, a first value of the metric for the robot based on the collected observer data; and returning, from the server, the first value for the metric.

The method of operation in a robotic system, the robotic system including server and a robot, may further include distributing, from the server, the information specifying the dynamic representation of the robot in an environment.

The method of operation in a robotic system, the robotic system including server and a robot, may further include committing, by the server, information specifying an observer agent in a database of observer agents.

The method of operation in a robotic system, the robotic system including server and a robot, may further include reconciling, by the server, the data from the at least one observer agent and the information representing a control history of the robot.

The method of operation in a robotic system, the robotic system including server and a robot, may further include: creating, by the server, a value of a measure describing the correctness of the value of the metric generated from the observer data from the at least one observer agent.

Receiving information representing the control history of the robot may further include receiving information representing the control history of the robot.

The method of operation in a robotic system, the robotic system including server and a robot, may further include: generating, by a user computer, the request to produce the value of the metric for the robot; and sending, by the user computer, information representing the control history of the robot.

The method of operation in a robotic system, the robotic system including server and a robot, may further include generating, by a user computer, the dynamic representation of the robot in the environment over the first period.

The method of operation in a robotic system, the robotic system including server and a robot, may further include: receiving, by an observer computer, the observer interface; receiving, by the observer computer, input from an observer agent; generating, by the observer computer, the observer data; and sending, from the observer computer, the observer data to the server.

A system may be summarized as including: a robot; at least one processor; at least one non-transitory computer-readable storage media communicatively coupled to the at least one processor, and which stores processor-executable instructions thereon which when executed causes the at least one processor to: receive a request to produce a value for a metric for the robot over a first period; receive information representing a control history of the robot over the first period; receive information specifying a dynamic representation of the robot in an environment over the first period, wherein the dynamic representation depicts the robot within a scenario; generate an observer interface to be presented to at least one observer agent; distribute the observer interface to the at least one observer agent; collect observer data from the at least one observer agent; compute a first value of the metric for the robot based on the collected observer data; and return the first value for the metric.

When executed, the processor-executable instructions may further cause the at least one processor to distribute the information specifying the dynamic representation of the robot in an environment. When executed, the processor-executable instructions may further cause the at least one processor to commit information specifying an observer agent in a database of observer agents. When executed, the processor-executable instructions may further cause the at least one processor to reconcile the data from the at least one observer agent and the information representing a control history of the robot. When executed, the processor-executable instructions may further cause the at least one processor to create a value of a measure describing the correctness of the value of the metric generated from the observer data from the at least one observer agent. The at least one processor may receive information representing the control history of the robot. When executed, the processor-executable instructions may further cause the at least one processor to: generate the request to produce the value of the metric for the robot; and send, by the user computer, information representing the control history of the robot. When executed, the processor-executable instructions may further cause the at least one processor to generate the dynamic representation of the robot in the environment over the first period. When executed, the processor-executable instructions may further cause the at least one processor to: receive the observer interface; receive, by an observer computer, input from an observer agent; generate, by the observer computer, the observer data; and send, from the observer computer, the observer data to the server.

A system may be summarized as including a computer and a robot substantially as described and illustrated herein.

A robot may be summarized as substantially as described and illustrated herein.

A method of operation of a system including a computer and a robot may be summarized substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
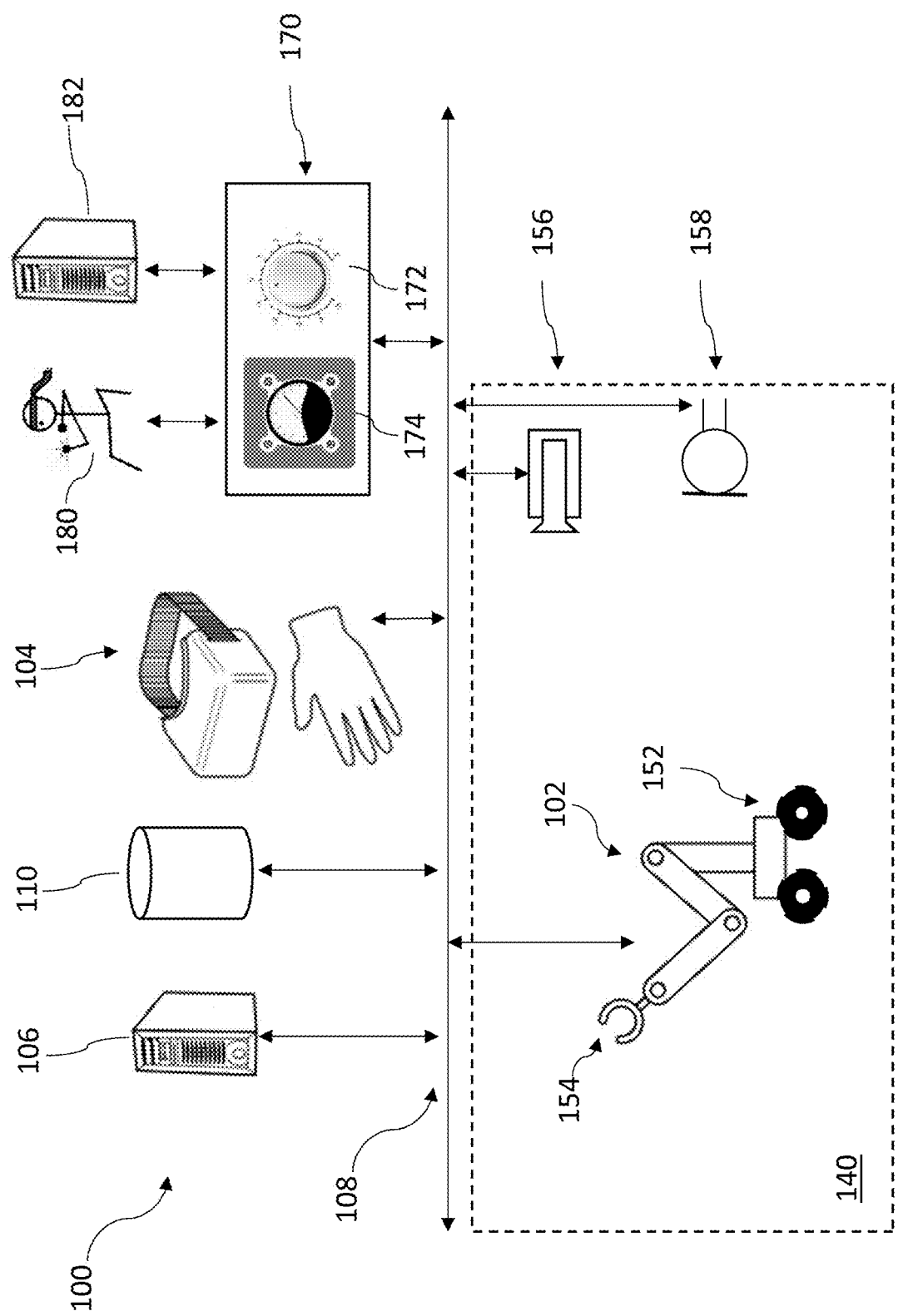
FIG. 1 is a schematic diagram illustrating a portion of a system including distributed hosts that may be used to implement the present systems, devices, articles, and methods.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with machine learning and/or robotics, such as processors, sensors, storage devices, and network interfaces, have not been shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", or "implementation" means that a particular referent feature, structure, or characteristic described in connection with the embodiment, example, or implementation is included in at least one embodiment, example, or implementation. Thus, the appearances of the phrases "in one embodiment", or "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the singular forms "a", "an", and "the" include plural referents unless the content clearly dictates otherwise. Thus, for example, reference to a problem-solving system including "a computer server" includes a single computer server, or two or more computer servers. It should also be noted that the term "or" is generally employed in its sense including "and/or" unless the content clearly dictates otherwise.

The headings provided herein are for convenience only and do not interpret the scope or meaning of the embodiments.

Can a robot seem human? That is, can a robot behave humanly or appropriately in a context or scenario, and/or perform a task like a human? This is analogous to the question addressed by famed inventor Alan Turing "can a machine think?" which spawned many technical problems, inquiries, and solutions. Amongst these was the Imitation Game, and Turing Test, where an interrogator questions a machine and/or human via written notes. The interrogator assesses the nature and/or attributes of the machine or human via these question and answer sessions.

The present question has many technical (sub-)problems. For example, what are the meets and bounds of a "robot"? What does "seem" mean? A robot includes a machine controlled by a computer processor and a machine controlled by an operator at an operator interface. Applicants propose that for a robot to seem human it must be judged to have humanness. Applicants have reason believe this judgement should be from diverse observers. Applicants propose systems, devices, articles, and methods to present depictions of robots within different contexts to observers such as trained classification computing machines or humans; then collect, aggregate, and process the quantitative assessment of the observers on the appropriateness of a robot's behavior in a context or scenario, and/or performance in a task. The quantitative assessment may be reduced to a metric; e.g., a so called "bot or not" metric.

Applicants propose systems, devices, articles, and methods that automate the assessment or classification of a robot's humanness. Included in, or associated with, these systems, devices, articles, and methods are classifier systems, classification computing system, or classifiers, that during a training phase acquire the ability to automatically classify whether a robot seems human or not. In use, these automated classifier systems determine whether a robot seems human or not. In some implementations, the classifiers are differentiable with respect to variables in the control history of a robot such that the classifier may automatically suggest how a robot could seem more human or not.

Traditional computers excel at tasks that expressed by simple algorithms involving bounded data. For example, traditional spreadsheets involves tasks that are easily expressed in terms of processor executable imperative programming instructions. The instructions operate to receive user input, update a mathematical model, and display an output. However, there are tasks processors have difficulty in performing, even if many processors are used. Such tasks include, amongst others, speech recognition, speech to text conversion, image recognition, and pattern recognition. Applicant believe that judging humanness, intelligence, motion, action, voice, and the like are not easy for a processor-based device. Finding solutions to these technical problems is a focus in machine learning innovation and development. While advances have been made, some underlying problems have not been satisfactorily addressed. Better systems, devices, articles, and methods are needed to help solve the problems that tend to be almost trivial for humans but difficult for computer processors. Applicants propose systems, devices, articles, and methods including hybrid machine/human computing systems that advantageously and selectively involves humans to assist a processor to more efficiently solve particular problems such as judging humanness, intelligence, motion, action, voice, and the like.

FIG. 1 shows an exemplary computing system 100 in accordance with the present system, devices, articles, and method. Various components of system 100 are optional. As shown, the system 100 includes a plurality of hosts in communication with each other, e.g., coupled by or as a network. The plurality of hosts include a robot 102. The robot 102 may be associated with an optional operator interface 104. The plurality hosts includes a computer system 106, an example of a processor-based device. While illustrated as two hosts, i.e., robot 102 and computer system 106, various implementations can include a greater number of robots (102) and/or computer systems (106). In some embodiments, system 100 includes a nontransitory computer- and processor-readable storage device 110.

The plurality hosts, e.g., robot 102 and computer system 106, are communicatively coupled via a network or non-network communication channel 108. Examples of a suitable network or non-network communication channel 108 include a wire based network or communication channel, optical based network or communication channel, wireless network or communication channel, or a combination of wired, optical, and/or wireless networks or communication channels.

A human operator at operator interface 104 can pilot robot 102. In human operator controlled or piloted mode, the human operator observes representations of sensor data— for example, video, audio or haptic data received from one or more environmental sensors or internal sensor. The human operator then acts, conditioned by a perception of the representation of the data, and creates information or executable instructions to direct robot 102 or another robot. Robot 102 operates in, and receives data about, an environment 140 that comprises a physical space. The term "about" is employed here in the sense of represent, characterize, or summarize one or more characteristics of the environment 140. In piloted mode, robot 102 executes robot control instructions in real-time (e.g., without added delay) as received from the operator interface 104 without taking into account or revision by the controller based on sensed information.

In some implementations, robot 102, operates without an operator interface 104 or human operator, e.g., autonomously. Robot 102 may operate in an autonomous control mode by executing autonomous control instructions. For example computer system 106 or robot 102 can use the sensor data associated the robot control instructions and the robot control instructions from one or more times, instances or periods when robot 102 was in piloted mode to generate autonomous robot control instructions for subsequent use. For example, by using deep learning techniques to extract features from the sensor data such that in autonomous mode the robot autonomously recognize features and/or conditions in its environment and in response perform a defined set of acts or a task, for instance recognizing the presence of a red ball, or any colour ball, depending on the features extracted from the sensor data, and kicking the ball. In the absence of a ball, the robot executing the autonomous robot control instructions would not kick the air as if a ball was present. The computer system 106 may, in some instances, be termed or referred to interchangeably as a computer, server or an analyzer. An analyzer may create autonomous control instructions for robot 102 or another robot.

In some instances, robot 102 may be controlled autonomously at one time, while being piloted, operated, or controlled by a human operator at another time. That is, operate under an autonomous control mode and change to operate under a piloted mode (i.e., non-autonomous). In a third mode of operation robot 102 can replay or execute piloted robot control instructions in a human operator controlled (or piloted) mode. That is operate without sensor data and replay pilot data.

A robot, like robot 102, is an electro-mechanical machine controlled by circuitry and/or a processor following processor-executable instructions; a human operator controllable electro-mechanical machine; a robotic subsystem (or apparatus) of another machine including a robot; or the like. A robot performs physical tasks, for example, working with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included in a larger system like system 100.

A robot typically includes a propulsion or motion subsystem comprising of one or more motors, solenoids or other actuators, and associated hardware (e.g., drivetrain, wheel(s), treads), to propel the robot in a physical space. Drivetrain and wheels 152 is an example of a motion subsystem. The space does not need to be horizontal or terrestrial. Examples of spaces include water, air, vertical spaces, outer space and the like.

A robot typically includes a manipulation subsystem comprising one or more appendages, such as, one or more arms and/or one or more associated end-effectors, arm and end-effector 154. An end-effector is a device attached to a robotic arm designed to interact with the environment. End-effectors for robot operating in unstructured environments are devices of complex design. Ideally, these are capable of performing many tasks, including for example grasping or gripping or otherwise physically releasably engaging or otherwise interacting with an object.

System 100 includes a sensor subsystem comprising one or more sensors, such as, one or more imagers or cameras 156, and/or one or more microphones 158. (Robot 102 may include onboard sensor system. See examples, disclosed herein at, at least, FIG. 2.) A sensor subsystem acquires data that characterizes or represents the robot 102 in a context or scenario, and/or performing one or more tasks. The data includes environmental sensor information representative of environmental conditions external to the robot. The data includes internal sensor information representative of internal conditions of the robot.

System 100 includes an observer interface system. System 100 includes one or more observer interfaces 170 coupled to network or non-network communication channel 108. The observer interfaces (alternative rating interface or score interface), include input and output portions. An example of an output portion is a display of explanatory text and dynamic representation of robot 102 in a context or scenario. For example, the dynamic representation robot includes video and audio feed, for instance a computer-generated animation. Useful video and audio formats include H264 and Opus respectively. Example of an input portion includes a control knob 172. In some implementations, the observer interface includes a gauge, graph, or other presentation of information. The observer interface can display a question or a series of questions for an observer agent. The observer interface can be a tangible manufacture or a visual presentation in a user interface. An example interface is shown and described herein at FIG. 13. Observer interface(s) 170 are distributed to one or more observer agents. Examples of observer agents, or observer(s), include a human observer 180 at a processor-based device (not shown) and a machine observer or processor-based device 182. Examples of processor-based device for computer interface observer interface(s) 170 associated with human observer 180 include a wearable computer, mobile phone, tablet, and personal computer.

While system 100 is illustrated with one robot 102, one computer system 106, and one or more observers (e.g., 182), various implementations can include a greater or lesser number of robot 102, computer system 106, and/or observer 180. In a human operator controlled mode, a human operator 105 observes representations of sensor data—for example, video, audio or haptic data received from one or more environmental sensors or internal sensor. The human operator then acts, conditioned by a perception of the representation of the data, and creates information or executable instructions to direct the at least one of the one or more of robots 102.

Figure 2:
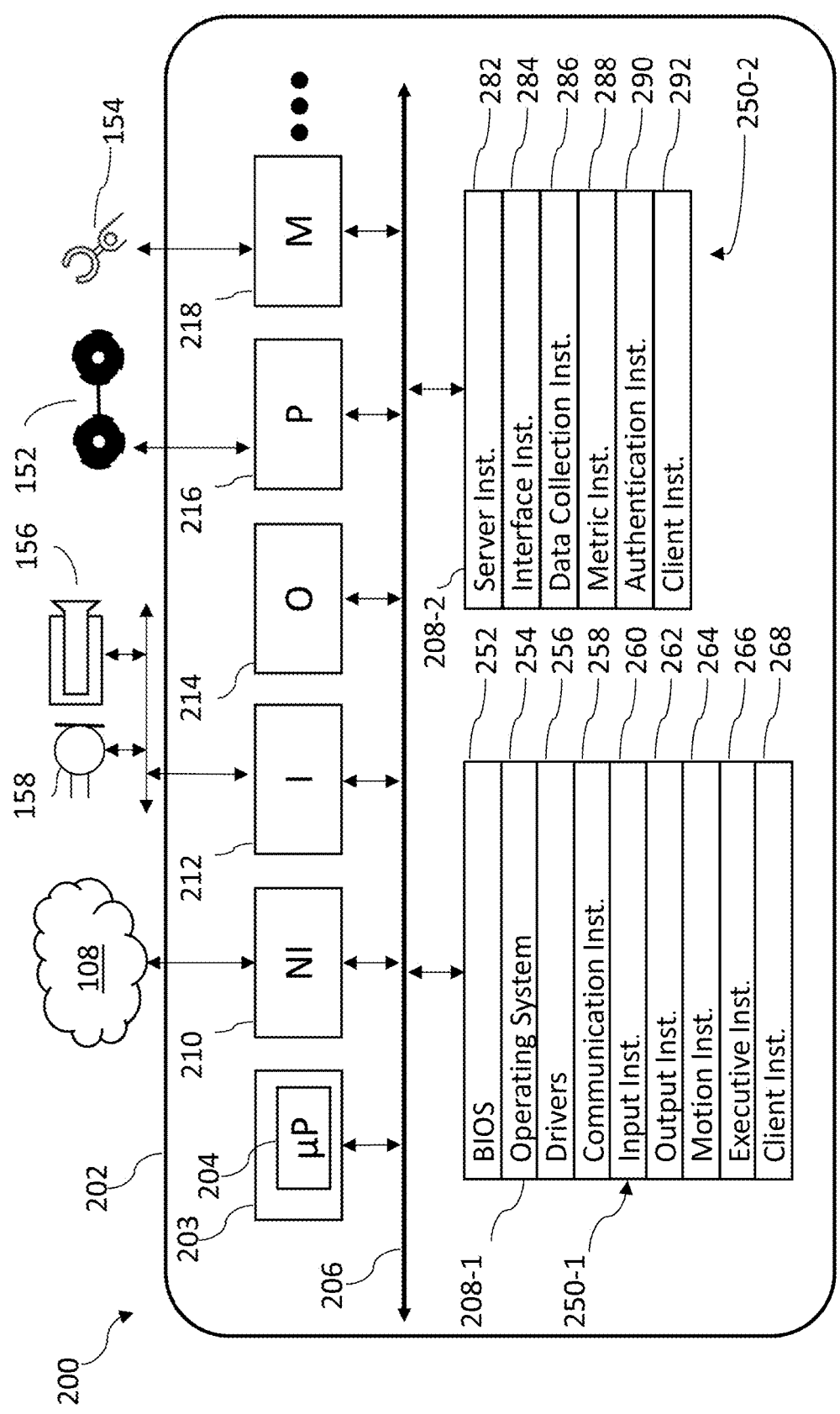
FIG. 2 is a schematic view illustrating an exemplary robot suitable for inclusion in the system of FIG. 1.

FIG. 2 schematically shows parts of a robot, including a processor, for use as a host in the system 100, shown in FIG. 1, in accordance with the present systems, devices, articles, and methods. In some implementations, the host is robotic apparatus such as robot 200. Robot 200 includes at least one body or housing 202, and a control subsystem 203 that includes at least one processor 204, at least one nontransitory computer- or processor-readable storage device 208-1, and at least one bus 206 to which, or by which, the at least one processor 204 and the storage device(s) 208-1 are in communication. In some implementation, a host comprises a sub-set of the illustrated system 200, including control system 203, bus(es) 206, storage device 208-1, and network interface subsystem 210.

Robot 200 includes a network interface subsystem 210 that is in communication with bus(es) 206 and provides bi-directional communication with other systems (e.g., external systems external to the robot 200) via a network or non-network communication channel 108. The network interface subsystem 210 includes one or more buffers. Network interface subsystem 210 receives and sends data related to training machine learning models. Network interface subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI compliant, BLUETOOTH compliant, cellular (e.g., GSM, CDMA), and the like.

Robot 200 includes an input subsystem 212 comprising one or more sensors that detect, sensor, or measure conditions or states of the robot and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like. Robot 200 includes an output subsystem 214 comprising output devices, such as, speakers, lights, and displays. Input subsystem 212 and output subsystem 214, are in communication with processor(s) 204 via bus(es) 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 includes a propulsion or motion subsystem 216 comprising motors, actuators, drivetrain, wheels, and the like to propel or move the robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drivetrain and wheels 152.

Robot 200 includes a manipulation subsystem 218, for example comprising one or more arms, end-effectors, associated motors, solenoids, other actuators, linkages, drivebelts, and the like coupled and operable to cause the arm(s) and/or end-effector(s) to move within a range of motions. For example, the manipulation subsystem 218 includes end-effector 154. The manipulation subsystem 218 and processor(s) 204 are in communication via bus(es) 206.

A person of ordinary skill in the art will appreciate the components in robot 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations, one or more of the subsystems (e.g., input subsystem 212) are split into further subsystems. In some implementations, bus(es) 206 is a plurality of buses (e.g., data buses, instruction buses, power buses) included in at least one body. For example, as part of a modular computing architecture where computational resources at distributed over the components of robot 200. That is, a robot, like robot 200, could in some implementations, have a processor in a left arm and a storage device in its thorax. In some implementations, computational resources are located in the interstitial spaces between structural or mechanical components of the robot 200. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 204 may be referred to in the singular, but may be two or more processors.

Network interface subsystem 210 may be any circuitry effecting bidirectional communication of processor-readable data, and processor-executable instructions. Suitable communication protocols include FTP, HTTP, Web Services, SOAP with XML, and the like.

The at least one storage device 208 is at least one nontransitory or tangible storage device. In some implementations, storage device(s) 208 includes two or more distinct devices. The storage device(s) 208 can, for example, include one or more a volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and nonvolatile storage, for example, caching, using solid-state devices as hard drives, in-memory data processing, and the like.

Storage device(s) 208-1 includes or stores processor-executable instructions and/or processor-readable data 250-1 associated with the operation of robot 200, system 100, and the like. The term processor-executable instructions or data may be, unless the context dictates otherwise, read as a contraction of processor-executable instructions and/or processor-readable data.

The execution of the processor-executable instructions or data 250-1 cause the at least one processor 204 to carry out various methods and actions, for example via the propulsion or motion subsystem 216 or manipulation subsystem 218. The processor(s) 204 can cause a robot, such as robot 200, to carry out various methods and actions. Processor-executable instructions or data 250-1 can, for example, include a basic input/output system (BIOS) 252, an operating system 254, drivers 256, communication instructions or data 258, input instructions or data 260, output instructions or data 262, motion instructions or data 264, and executive instructions or data 266.

An exemplary operating system 254 includes ANDROID™, LINUX®, and WINDOWS®. The drivers 256 include processor-executable instructions or data that allow processor(s) 204 to control circuitry of robot 200. The processor-executable communication instructions or data 258 include processor-executable instructions or data to implement communications between the robot 200 and an operator console or terminal, a computer, or the like. The processor-executable input instructions or data 260 guide robot 200 in processing input from sensors in input subsystem 212. Processor-executable output instructions or data 262 guide the robot 200 in interacting within the environment via components of manipulation subsystem 218 or output subsystem 214. Processor-executable motion instructions or data 264 guide robot 200 in moving within its environment via components in propulsion or motion subsystem 216.

The processor-executable executive instructions or data 266 guide the robot 200 in reasoning, problem solving, planning tasks, performing tasks, and the like. The processor-executable executive instructions or data 266 implement, in part, the methods described herein, including those in and in relation to FIG. 5, etc.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible or nonvisible ranges of the electromagnetic spectrum including for instance infrared and ultraviolet), radars, sonars, touch sensors, pressure sensors, load cells, microphones, meteorological sensors, chemical sensors, or the like. Exemplary sensors include camera 156 and microphone 158. Sensor information can, for example, include diagnostic sensor information that is useful in diagnosing a condition or state of the robot 200 or environment in which robot 200 operates. For example, such sensors may include contact sensors, force sensors, strain gages, vibration sensors, position sensors, attitude sensors, accelerometers, and the like. In some implementations, the diagnostic sensors include sensors to monitor a condition or health of an on-board power source (e.g., battery array, ultra-capacitor array, fuel cell array).

The output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

FIG. 2 schematically shows exemplary parts of a computer 106, including a processor, in accordance with the present system, devices, articles, and methods. The system 106 shares some similar components with robot 200 but typically differs in lacking the propulsion or motion sub-system and the manipulation sub-system. The computer system 106 has different sub-components within some sub-systems, such as, the input and output sub-systems.

The computer system 106 includes at least one body or housing 202, and a control subsystem 203 that includes at least one processor 204, at least one nontransitory computer- or processor-readable storage device 208-2, and at least one bus(es) 206 to which the at least one processor 204 and the at least one nontransitory computer- or processor-readable storage device 208-2 are communicatively coupled. The computer system 106 includes a network interface subsystem 210 is communication with bus(es) 206 and provides bi-directional communication with other systems (e.g., computers associated with observers, online storage providers) via network or non-network communication channel 108.

The computer system 106 includes an input subsystem 212. In some implementations, the subsystem 212 includes one or more user interface input devices such as a touch display, a keyboard, a mouse or other pointer device, a microphone, and a camera. In some implementations, input subsystem 212 is coupled to the control subsystem 203 via network interface subsystem 210. In some implementations, input subsystem 212 includes one or more sensors such as environmental sensors.

The computer system 106 includes an output subsystem 214 comprising one or more output devices, such as, displays, speakers, and lights. Input subsystem 212 and output subsystem 214, and processor(s) 204 are in communication via bus(es) 206.

The storage device(s) 208-2 includes or stores processor-executable instructions or data 250-2 associated with the operation of computer system 106 and system 100. The processor-executable instructions or data 252-262 are described herein and with appropriate changes are applicable to computer system 106.

The processor-executable server instructions or data 282 guide computer system 106 to in coordinating the operation of system 100, or to act as a mediator between robot 102, camera 156, observers, and the like. Interface instructions or data 284 guide computer system 106 in establishing and distributing observer interfaces (also called rating interfaces). In some implementations, data collection instructions or data 286 allow computer system 106 to collect data from one or more observers. The data may include: one or more ratings from one or observers received via an observer interface; one or more ratings from a classification computing system, such as, an automated classifier; and the like. In some implementations, the data characterizes a rating for the robot is an annotation on a dynamic representation of the robot such as a media feed. In some implementations, the data includes two or more of temporal, categorical, and Boolean information. For example, the information includes an assessment of a robot and a time for the assessment.

The processor-executable metric instructions or data 288 allow computer system 106 to compute one or more metrics for one or more robot or observer. In some implementations, processor-executable authentication instructions or data 290 allow computer system 106 to authenticate the one or more control histories for a robot, dynamic representation including the robot, and rating data. The processor-executable instructions or data 282-290 implement, in part, the methods described herein, including those in and in relation to FIGS. 5-10.

FIG. 2 schematically shows exemplary parts of a processor-based device 182, including a processor, in accordance with the present system, devices, articles, and methods. Processor-based device 182, which may act as an observer, shares some similar components with robot 200 but typically differs in lacking the propulsion or motion sub-system and the manipulation sub-system. Processor-based device 182 may also differ from computer system 106 has different sub-components within some sub-systems, such as, the input and output sub-systems. In processor-based device 182, storage device(s) 208-2 includes or stores processor-executable instructions or data 250-2 associated with the operation of system 100. For example, the processor-executable instructions or data 250-2 includes processor-executable client instructions or data 292 to receive and send data. For example, receive a media feed depicting a robot performing a task and sending an assessment of the robot.

Output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

Figure 3:
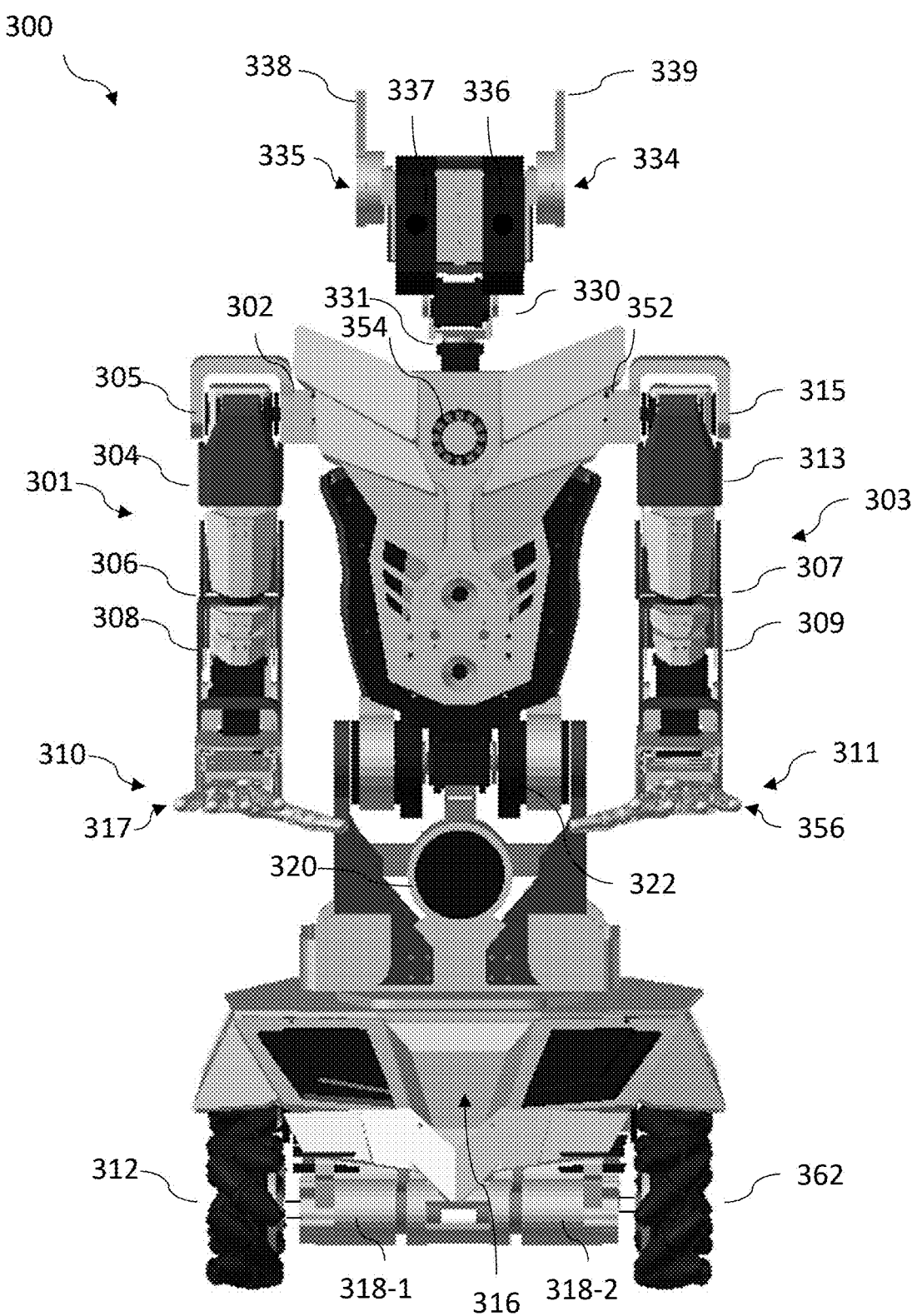
FIG. 3 is an elevation view illustrating a robot in accordance with the present systems, devices, articles, and methods.

FIG. 3 illustrates an exemplary robot 300. As discussed herein, robots may take any of a wide variety of forms. These include human operator controllable robots, autonomous robots with on-board control, autonomous robots controlled by a non-human operator, and hybrid robots (i.e., partially autonomous, partially piloted). A robot comprises one or more bodies, also called structural components, or brackets. The bodies are coupled by joints, for example, bearings, and/or servo-motors. For example, a first body is connected to a second body by a servo or the like. It is possible to describe a robot in terms of the joints or the bodies. FIG. 3 is described in terms of the joints but a person of skill in the art will appreciate a body based description is possible.

In various implementations, shoulder servos 302 and 305 may control and sense roll and pitch respectively of a shoulder of a first arm 301 of robot 300. In some implementations, shoulder servos 302 and 305 may, for example, be DYNAMIXEL™ MX-28, MX-64, or AX-12 servo-motors produced by ROBOTIS CO. LTD. of Seoul, South Korea.

In some implementations, the shoulder yaw servo 304 may control and sense the yaw of first arm 301 of robot 300. In various implementations, the shoulder yaw servo 304 may be a servo-motor like shoulder servos 302 and 305. Yaw is a motion analogous to medial rotation (i.e., inward rotation toward the body) and lateral rotation (i.e., outward rotation away from the body).

In some implementations, elbow servo 306 may control and sense an elbow of the first arm 301 of robot 300. In various implementations, the elbow servo 306 may be a servo-motor like shoulder servos 302 and 305.

In various implementations, the end-effector 310 may include a plurality of digits 317. For example, four fingers and a thumb are shown in FIG. 3. A thumb is generally regarded as a digit that may be used to oppose two more digits. In the case of an opposed pair of digits the thumb may be the shorter or less mobile digit. In some implementations, the digits of the end-effector 310 may include embedded force sensitive resistors. Respective servos, which may, for example be DYNAMIXEL™ XL-320 servo-motors or TOWERPRO™ hobby servos, may operate each digit independently. The end-effectors may, in some implementations, facilitate dexterous manipulation of objects. Each of shoulder servos 302 and 305, and servo in robot 300, work cooperatively with a respective joint, or joint and gearbox. In various implementations, roll is adduction (i.e., appendage moves toward torso) and abduction (i.e., appendage moves away from torso) of first arm 301. In various implementations, pitch is flexion (i.e., appendage reduces angle between itself torso of more proximal appendage) and extension (i.e., appendage increases angle) (e.g., backward) of first arm 301.

In some implementations, one or more digits of digits 317 of the end-effector 310 may have polymer filled internal and external structure and/or rubber pads proximate to the extremities of the one or more digits of digits 317. The material may, in operation enhance grip capacity of an end-effector and simulate the resistance of a human finger.

In some implementations, digits, such as digits 317, may each have one or more contact sensors and/or pressure sensors to sense pressure applied to the sensor and produce signals proportional to the pressure.

The second arm 303 is generally similar to the first arm 301 but mirrored. Referring to FIG. 3, the second arm 303 includes a shoulder roll servo 352, a shoulder pitch servo 315, a shoulder yaw servo 313, an elbow servo 307, a wrist servo 309, and end-effector 311 including a plurality of digits 356.

In at least one implementation, robot 300 includes one or more components including wheels, such as wheel 312 and wheel 362, an electronics compartment 316, DC motors 318-1 and 318-2, a speaker 320, a waist pitch servo(s) 322, an interlock 326 (to share torso support with waist pitch servo(s) 322), a single board computer (SBC) (not shown), two neck servos including a head pitch servo 330 and a head yaw servo 331, ear servos 334 and 335, cameras 336 and 337, microphones 338 and 339, lights/LEDs 354 and cable bundles (not shown).

In some implementations, wheel 312 and wheel 362 provide the capacity for locomotion to robot 300. Wheel 312 and wheel 362 may provide a broad base which, in some examples, increases stability of robot 300. In other implementations, one or more treads can provide locomotion.

In various implementations for example, one or more on-board power sources may be found in compartment 316. The on-board power sources can, for example include one or more batteries, ultra-capacitors, fuel cells, to independently power different components of robot 300. Servos can be on divided up over different batteries.

Exemplary batteries include secondary cells, for instance lithium polymer cells, for example, a 16V, 10000 mAh, four cell, LiPo battery; a 4000 mAh 3 cell 12 V battery; a 5 V 9600 mAh, USB mobile charging power pack; and a batter pack including one or more 3.7 V lithium ion batteries.

Figures 4A, 4B:
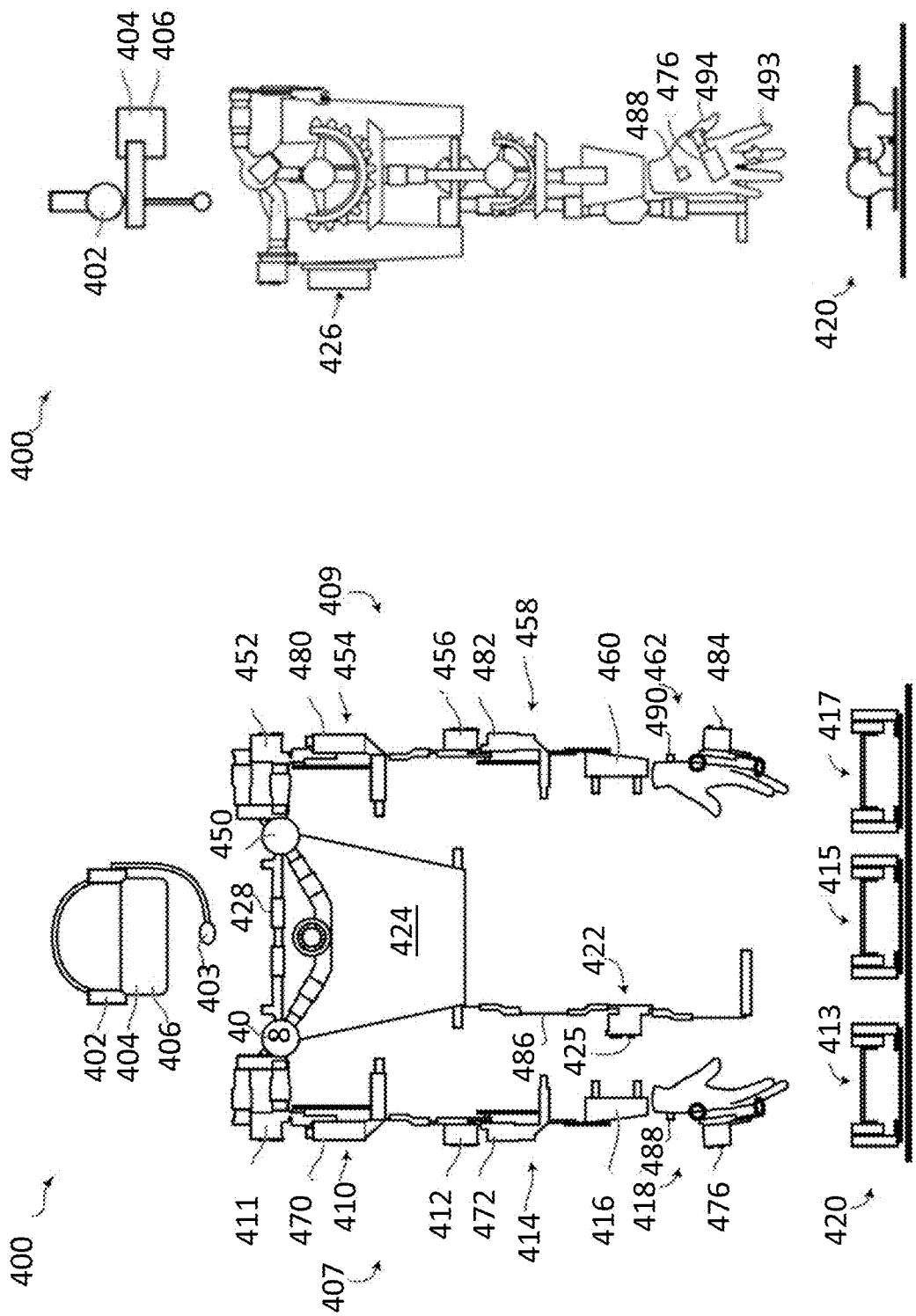
FIG. 4A is a front elevation schematic view illustrating an exemplary human operator interface in accordance with the present systems, devices, articles, and methods.
FIG. 4B is a side elevation schematic view of the human operator interface shown in FIG. 4A in accordance with the present systems, devices, articles, and methods.

FIGS. 4A-4B schematically show parts of operator interface 400 as an example of operator interface 104. FIG. 4A shows a front elevation view of the operator interface 400. FIG. 4B shows a side elevation view of the operator interface 400 shown in FIG. 4A. The operator interface 400 may include one or more of a processor (e.g., an operator interface processor), bus, processor readable storage device, display, potentiometer, speaker, microphone, inertial measurement unit ("IMU"), haptic glove or manipulator interface, and input/output ("I/O") interface, all of which are in communication with the operator interface processor. As discussed above, in various implementations an operator interface generally similar to the operator interface shown in FIGS. 4A-4B may include fewer, additional, or alternative sensors, actuators, and/or output devices to those of the operator interface 400 shown in FIG. 3.

The operator interface 400 includes left/right audio output 402, a microphone 403, left/right visual display 404, a head/neck motion sensor 406, and first and second arm sensor assemblies 407 and 409.

The first arm sensor assembly 407 includes a shoulder roll servo 408, a shoulder pitch servo 411, an upper-arm rotation capture device 410, an elbow servo 412, a lower-arm rotation capture device 414, a forearm mount or strap 416, and a manipulator interface or haptic glove 418. The second arm sensor assembly 409 may be generally similar to the first arm sensor assembly 407 but mirrored (although parts may be laterally interchangeable). Second arm sensor assembly 409 includes a shoulder roll servo 450, a shoulder pitch servo 452, an upper arm rotation capture device 454, an elbow servo 456, a lower arm rotation capture device 458, a forearm mount 460, and a manipulator interface or haptic glove 462.

Operator interface 400 includes a set of two or more locomotion pedals 420, such as, first, second, and third locomotion pedals 413, 415, and 417. The operator interface also includes a torso pitch interface 422 including an extension arm and a waist servo 425, a vest 424, an electronics back-box 426 and a chest/shoulder support structure 428.

In some implementations, left/right audio output 402 may be implemented using speakers or headphones to provide an interface for receiving audio information from an operator controllable device, such as, a robot, to an operator using operator interface 400. In some implementations, microphone 403 provides an interface for sending audio to an operator controllable device or may be used to voice to command interface.

The left and right visual displays 404 may provide an interface for displaying visual information captured by cameras for the operator controllable device, e.g., cameras 336 and 337. In some implementations, other visual information may also or alternatively be generated for display on left and right displays 404. An example of generated information which may be displayed on left and right visual display 404 is battery charge levels of the operator controllable device. In some implementations, the generated information includes a metric for a robot as determined by one or more observers. In one implementation, a virtual reality headset, such as, an OCULUS RIFT™, implements left and right visual display 404.

The head/neck motion sensor 406 senses or captures movement of an operator's head, specifically pitch and yaw. In one implementation, the head/neck motion sensor 406 may include a gyroscope, an accelerometer, a magnetometer, and/or another inertial measurement unit (IMU). In various implementations, head/neck motion sensor 406 is part of, e.g., built into, a virtual reality headset.

In various implementations, shoulder roll servo 408 and shoulder pitch servo 411 may sense or capture roll and pitch positioning of an operator's shoulder. In some implementations, the servos may include feedback resistors or potentiometers that provide signals representing servo position measurements. In some implementations, shoulder servos 408 and 411 sense or receive information about and then simulate or replicate positions of corresponding shoulder servos in an operator consolable device, e.g., 302 and 305 respectively. In some implementation, these servos 408 and 411 are DYNAMIXEL™ AX-12 servos. The term "about" is employed here in the sense of represent, characterize, or summarize.

Referring still to FIGS. 4A-4B, in various implementations, the upper arm rotation capture device 410 may sense or capture rotation of an upper arm of an operator. In some implementations, the upper arm rotation capture device 410 includes a first semi-circular gear mechanism that curls or wraps around the upper arm and couples with a second semi-circular gear mechanism at about 90 degrees to the first. In some implementations, the first and second semi-circular gear mechanisms cooperatively transfer the rotation of the upper arm to the rotation of a potentiometer 470 to the second gear mechanism. Potentiometer 470 may be centered around the second gear mechanism.

In some implementations, a non-moving part of the potentiometer physically couples to the operator's shoulder. In at least one implementation, the potentiometer has a wider than normal central shaft with a hole in the center. In some implementations, the potentiometer is, for example, a 39/20 mm or 44/25 mm CENTER SPACE ROTARY POTENTIOMETER from Panasonic Corp., Osaka, J P.

In some implementations, the elbow servo 412 may capture or sense an angle of an operator's elbow. For example, in at least one implementation, the elbow servo 412 is a DYNAMIXEL™ AX-12. In some implementations, elbow servo 412 simulates or replicates positions of the elbow servo of an operator controllable device, e.g., servo 306.

In some implementations, the lower arm rotation capture device 414 may capture or sense the rotation of the lower arm of the operator. In some implementations, lower arm rotation capture device 414 may operate generally similarly to the upper arm rotation capture device 410. The lower arm rotation capture device 414 includes a semi-circular gear mechanism that wraps around the lower arm and couples with a second semi-circular gear mechanism at 90 degrees to the first. This gear arrangement may transfer the rotation of the lower arm to the rotation of a potentiometer 472 centered around and connected to the second gear mechanism. In various implementations, a non-moving part of a potentiometer may be fixed to the operator's arm. Potentiometer 472 may, for example, be a 39/20 mm or 44/25 mm CENTER SPACE ROTARY POTENTIOMETER from Panasonic.

In various embodiments, the forearm strap 416 may secure the first arm sensor assembly 407 of the operator interface 400 to the operator. In some implementations, the haptic glove 418 may capture or sense a position of the operator's pointer finger and thumb relative to one another. A servo 476 may be attached to the haptic glove 418 at the center point of rotation of the thumb and pointer finger of the operator. The angle of the servo may be controlled by two armatures 493 and 494 with rings allowing coupling of the operator fingers to the armatures. One armature is attached to the operator glove thumb 494 and the second armature is affixed to the operator glove pointer finger 493. In some implementations, the servo may be configured to provide feedback information garnered from an end-effector of the operator controllable device to the fingers of the operator using the operator interface 400 in the form of resistance as the operator guides the operator controllable device to pick up an object. In some implementations, the haptic glove 418 may use a DYNAMIXEL™ AX-12 servo.

Haptic glove 418 may have a right vibrational device or buzzer 488, to vibrate with an amplitude or frequency that is a function of the signals coming from the finger pressure sensors of haptic glove 418 of robot 300. In some implementations, the amplitude or frequency may increase with increasing sensed pressure. Vibrational device 488 may be mounted on the back of the operator interface glove, or elsewhere on the haptic glove.

As discussed above, the second arm sensor assembly 409 mirrors and may be generally similar to the first arm sensor assembly 407. In some embodiments, upper arm rotation capture device 454 includes a potentiometer 480, lower arm rotation capture device 458 includes a potentiometer 482, and haptic glove 462 includes a servo 484 and a left vibrational device or buzzer 490.

In some implementations, an operator controls locomotion pedals 420. An operator generally will selectively use one or both feet to move the pedals. Locomotion pedals 420 are arranged and tuned such that angles sensed or captured by the pedals control the motors 318 of robot 300 and thus control locomotion of robot 300. In some implementations, left and right forward motion pedals 417 and 413 may operate independently triggering left and right wheel pairs 362 and 312 respectively of the motility subsystem of robot 300 and facilitate turning or strafing of robot 300.

In some implementations, the locomotion pedals 420 may include a reverse motion pedal 415 configured to control both left and right wheels 362 and 312 shown in FIG. 3. The three pedals may be fixed to a single rubber mat to prevent movement or sliding during use. In some implementations, each of the locomotion pedals 420 includes a rotating, pivoting, or swinging foot platform, a potentiometer to capture the angle of the foot platform, and a spring to return the pedal to a neutral position when the operator's foot is removed. The spring from a domestic mousetrap provides sufficient restorative force for the purpose.

In some implementations, the locomotion pedals 420 may include a pedal for the left drivetrain, a pedal for the right drivetrain, and a pedal for reverse. In some implementations, the left and right drivetrain pedals may provide signals which are combined to calculate a rotational and linear velocity of the operator controllable device.

In some implementations, a torso pitch interface 422 captures or senses how much an operator has bent forward by sensing the angle of the operator's torso relative to their hips or legs. An extension arm 486 on which a servo 425 is mounted may connect to the operator interface 400 by a hinge. In various embodiments, the extension arm may firmly connect to the operator's upper thigh. The waist servo 425 of the torso pitch interface 422 may, for example, be a DYNAMIXEL™ AX-12 servo.

In some implementations, operator vest 424 may provide a mounting structure for components of the operator interface 400. Vest 424 may attach and anchor the operator interface 400 firmly to the operator's body.

In some implementations, the electronics back-box 426 may be attached to vest 424 and may contain electronic components associated with the operator interface 400. In some implementations, electronics back-box 426 may contain an ARDUINO PRO MINI™ which captures the sensor signals from the potentiometers 470, 472, 480, and 482 and controls mounted on vest 424, power boards for the DYNA-MIXEL™ bus, a power-breakout board which may also act as a patch panel including patching of the hand sensor signals and some ground pins, an ODROID™ which handles the wireless adapter for WIFI communication as well as a USB2AX connector which allows the ODROID™ to send signals to the DYNAMIXELS. The ODROID™ may also send signals to the ARDUINO PRO MINI™. Electronics back-box 426 may also contain an ARDUINO UNO™ configured to receive or capture position information from the pedals 420.

The chest/shoulder support structure 428 allows for suspension of operator interface items from the frame rather than from the operator's limbs. In various embodiments, the chest/shoulder support structure 428 may facilitate removal of the weight of the operator interface 400 off of the operator's arms onto the operators shoulder and back.

Figure 5:
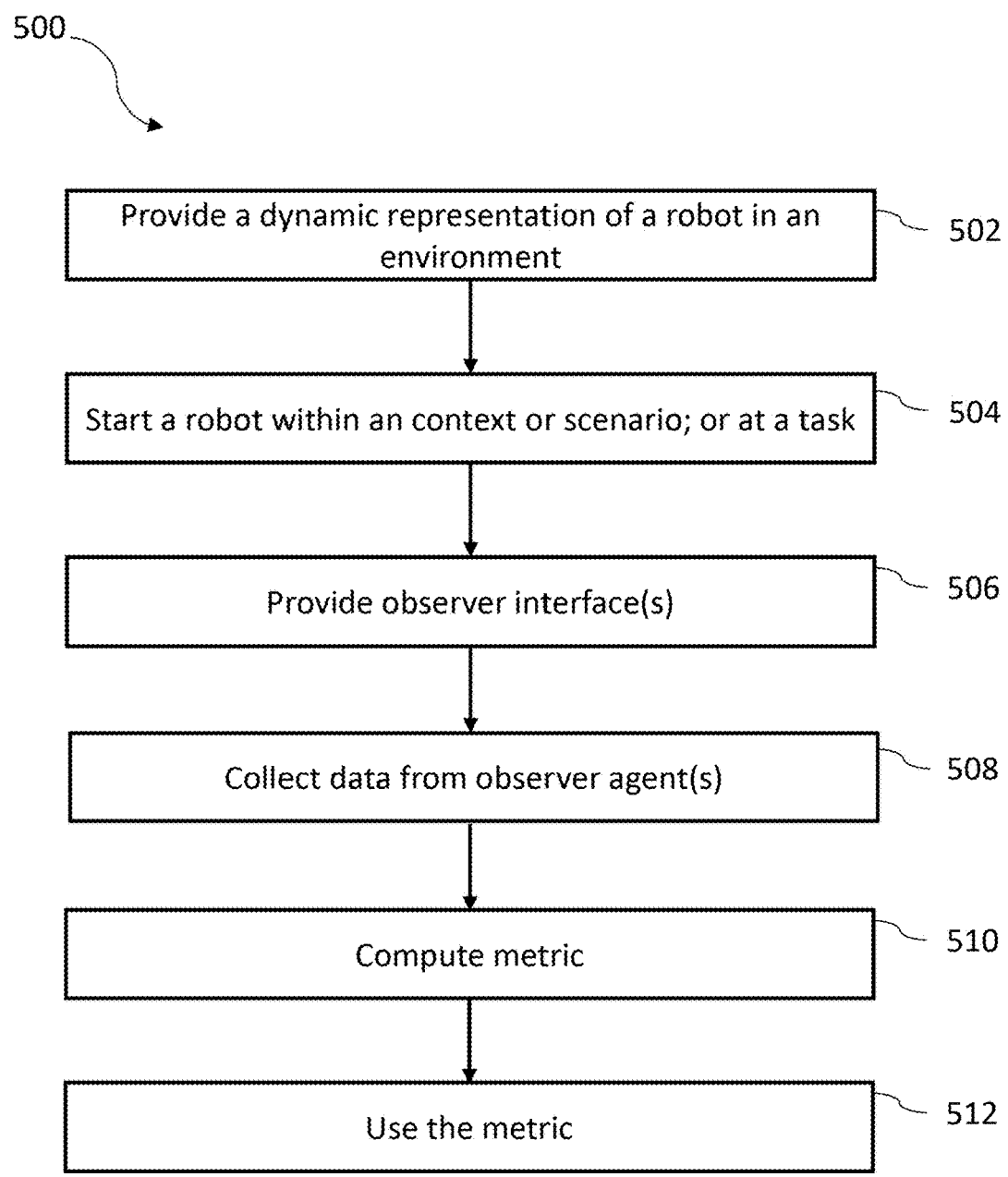
FIG. 5 is a flow-diagram of an implementation of a method to collect data from at least one observer in accordance with the present systems, devices, articles, and methods.

FIG. 5 shows method 500 executable by circuitry or at least one hardware processor that implements various techniques to compute a metric that characterizes or represents performance of a robot. The metric could represent how appropriate a robot is in a context, scenario, or at a task, or quantification of human preferences or judgment about intelligent behavior. In some implementation, the metric quantifies performance as regarded by one or more observers. Those of skill in the art will appreciate that other acts may be included, removed, and/or varied to accommodate alternative implementations. Method 500 is described as being performed by a controller, for example, control subsystem 203 or processor(s) 204 in conjunction with other components of system 100. However, method 500 may be performed by another system. For example, method 500 can be performed by in part by a computer system 106.

Method 500 begins, for example, in response to an invocation by the controller. At 502, the controller provides a dynamic representation of a robot in an environment. For example, a media feed, including an audio and video feed, that presents the robot in the environment. In some implementations, controller generates the media feed. In some implementations, controller receives and passes on the media feed.

At 504, the controller starts a robot. In some implementations, the controller starts a scenario for the robot. The controller may place the robot in a context. An example of a context is a robot waiting for a bus. In some implementations, the controller starts the robot at a task. In some implementations, the controller causes the robot to start by sending instruction to a robot or another agent via a network or non-network communication channel. In some implementations, the controller starts the robot prior to providing a dynamic representation of a robot. For example, in an online observation the dynamic representation begins mid scenario or task. Alternatively, the observation is offline and the dynamic representation depicts a previously recorded or completed scenario, task, or the like.

At 506, the controller provides an observer interface to one or more observers. Observers include computer agents and/or human observers. Human observers can be more prevalent during training of automated classification systems that later act as observers.

At 508, the controller provides collects data from one or more observers. The controller, collects via receipt, or request and receipt, information characterizing a rating or assessment for the robot from the one or more observers via one or more observer interfaces.

In some implementations, the information characterizing or specifying a response (e.g., prediction, rating or score) for the robot is an annotation on the media feed. In some implementations, the information includes two or more of temporal, categorical, and Boolean data. For example, the information includes an assessment of a robot and a time for the assessment.

At 510, the controller computes a metric. In some implementations, the controller computes an assessment of the robot's behavior within a context or a scenario. In some implementations, the controller computes an assessment of the robot at performing the task. In some implementations, the controller computes the metric from data aggregated over the one or more observers. Examples of metrics are described herein below.

At 512, in some implementations, the controller uses the metric to improve a control mode for a robot. For example, to adjust parameters in processor executable instruction and/or data that controls the robot. In some implementations, the controller returns the metric. In some implementations, the controller stores the metric in or on a storage device. In some implementations, the controller generates a signal including information representing the metric and causes the metric to be sent through a communication channel. In some implementations, the metric is associated with the dynamic representation. For example, the values of the metric annotate the dynamic representation of the robot.

Figure 6:
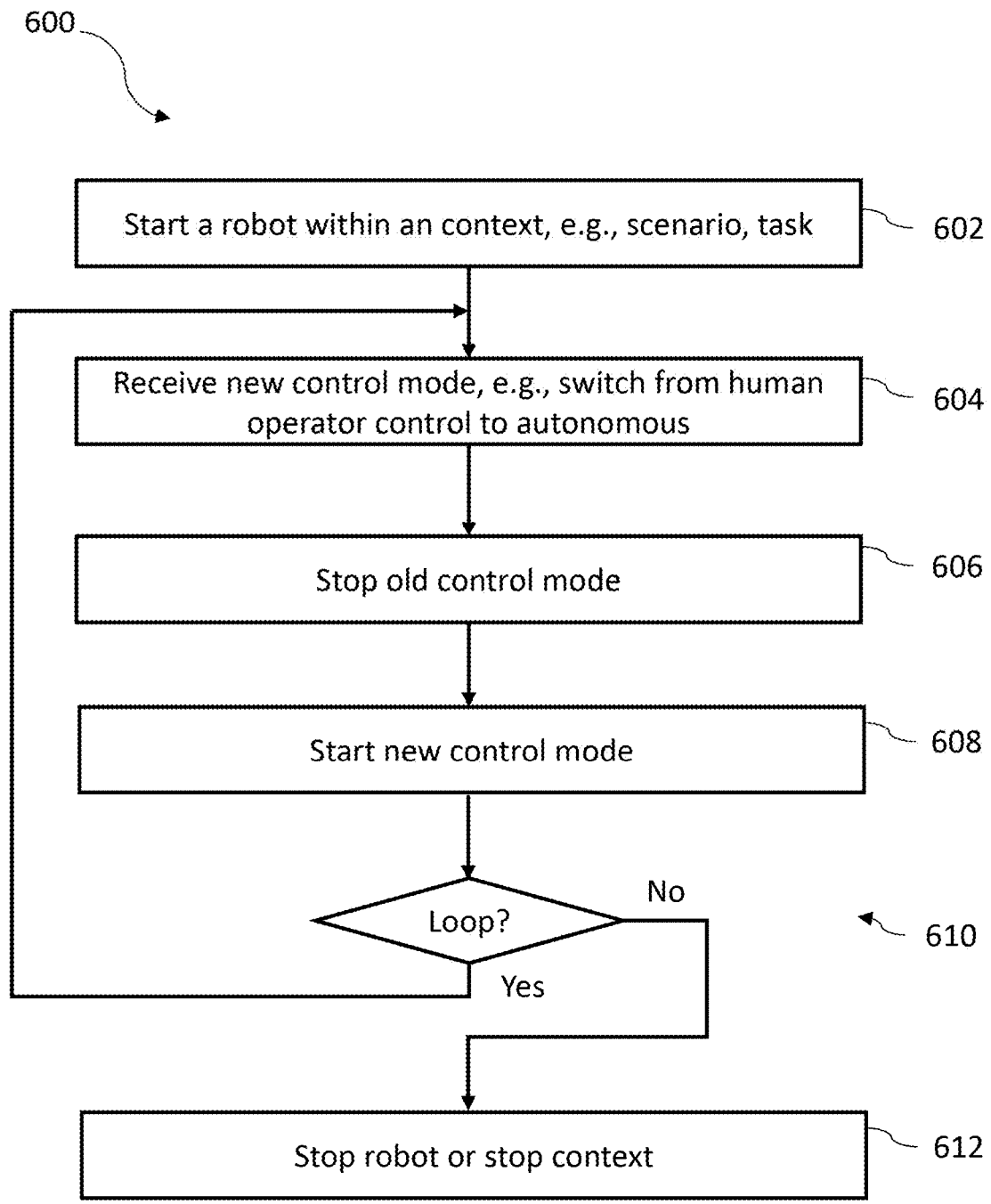
FIG. 6 is a flow-diagram of an implementation of a method to change the control mode of a robot in accordance with the present systems, devices, articles, and methods.

FIG. 6 shows a method 600 that implements a switch of control of a robot. Those of skill in the art will appreciate that other acts may be included, removed, and/or varied to accommodate alternative implementations. Method 600 is described as being performed by a robot controller, for example, control subsystem 203 or processor(s) 204 in conjunction with other components of system 100. However, method 600 may be performed by another agent. For example, method 600 can be performed by in part by an on-board control subsystem 203 in conjunction or cooperation with an off-board control system.

Method 600 begins, for example, in response to an invocation by the controller. At 602, the controller starts a robot. In some implementations, the controller starts a scenario for the robot. In some implementations, the controller places the robot in a context. In some implementations, controller starts the robot at a task. The robot is under a first control mode, e.g., human operator control or autonomous control.

At 604, the controller receives information specifying or requesting a new control mode and/or processor executable instructions and processor readable data to implement the new control mode. For example, the controller receives a request to switch from human operator control to autonomous control. In another example, the controller receives a request to switch from a first autonomous control mode defined by a processor executing a first set of processor readable instructions, to a second autonomous control mode defined by the processor, or different processor, executing a second set of processor readable instructions. That is, switch artificial intelligence.

The controller, at 606, stops the old control mode. At 608, the controller starts the new control mode. For example, over acts 606 and 608, the controller, stops autonomous control of the robot, and restarts the robot under user control. For example, over acts 606 and 608, the controller, stops user control of the robot, and restarts the robot under autonomous control. That is, controller changes the robot from human operator control mode to machine control mode.

At 610, the controller checks to see if it is to loop in method 600. If the controller is to loop then method 600 resumes prior to 604. Otherwise, at 612, the controller stops the robot; or stops the robot at the task or scenario, or removes the context, started at 602.

Figure 7:
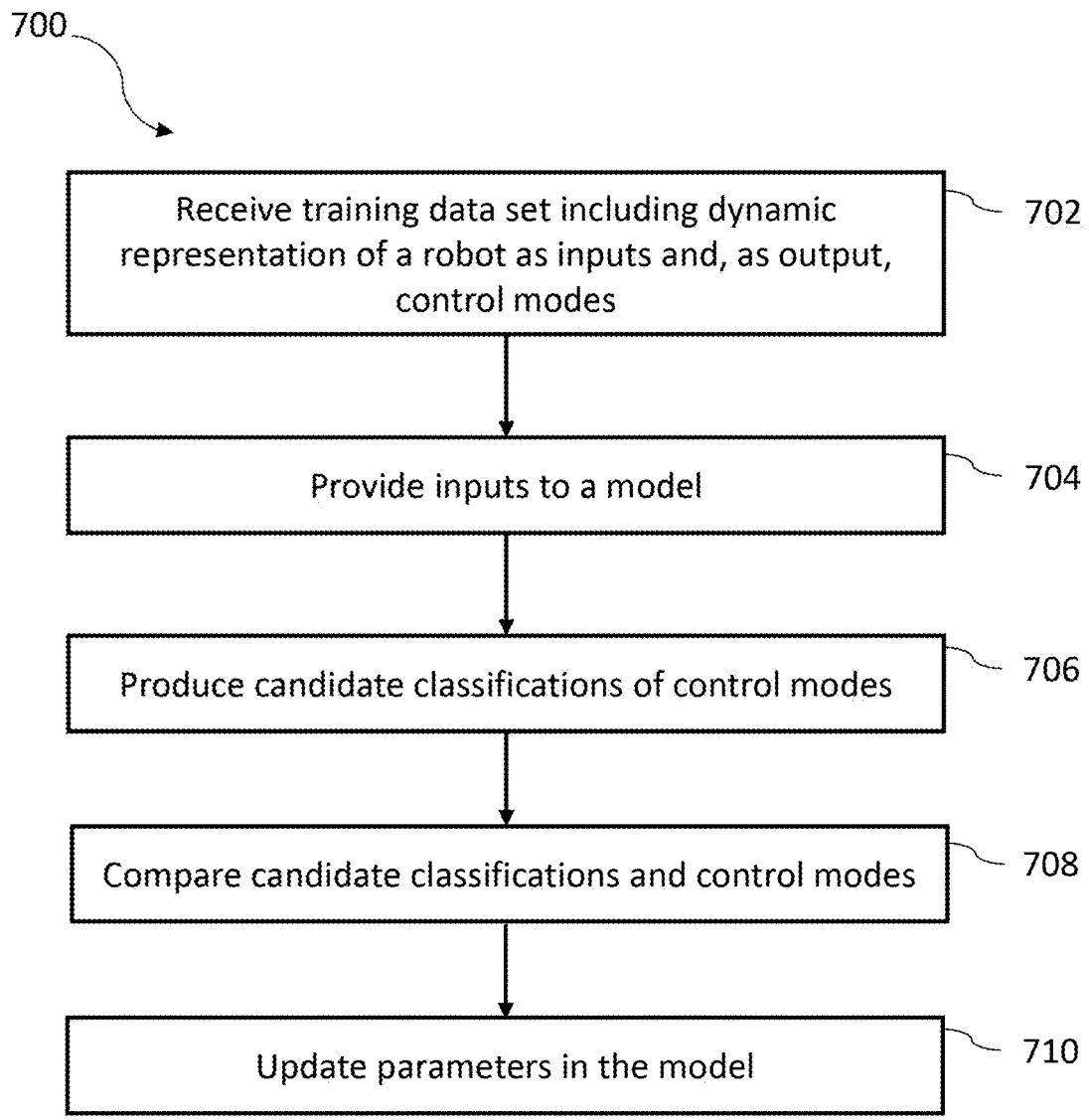
FIG. 7 is a flow-diagram of an implementation of a method of to update a classifier for an automated observer system in accordance with the present systems, devices, articles, and methods.

FIG. 7 shows a method 700 of operation for a controller (i.e., circuitry) to train an automated classification system. Those of skill in the art will appreciate that other acts may be included, removed, and/or varied to accommodate alternative implementations. Method 700 is described as being performed by a controller, for example, control subsystem 203 or processor(s) 204 in conjunction with other components of system 100. However, method 700 may be performed by another agent.

At 702, the controller receives training data. The training data includes inputs, for example, dynamic representation of a robot, and associated classifications as output. The dynamic representation of the robot could include the robot performing a task, or in a context, or within a scenario.

At 704, the controller provides into to a model, system, or other implementation of a classifier. A classifier is processor executable instructions executed by a processor. An automated classification machine is a computer executing to classifier. In some implementations, the controller provides as input a dynamic representation of robot performing a task.

At 706, the controller receives from the model, system, or classifier a candidate classification of the control modes. For example, the classifier could suggest a classification that a robot is, within an instant context, is within human operator control mode, or a machine control mode. In some implementations, the controller produces candidate classifications of the control modes at 706. At 708, the controller compares a candidate classification, and in some implementations more than one candidate classification, to classifications within the training data. The controller then quantifies an error between the candidate classification and the classification from the training data. That is the controller engages in supervised learning. Also at 708, the controller compares control modes.

At 710, the controller updates the model, system, or implementation of the classifier, in view of error if present. For example, the controllers adjust parameters to lessen the error in the output, i.e., classification.

In some implementations, the controller returns the model, system, or implementation of the classifier. In some implementations, the controller returns a set of parameters associated with the model, system, or implementation of the classifier. In some implementations, the controller generates a signal including information that represents the model, system, or implementation of the classifier, or parameters for foregoing. The controller may uses the signal to store the information in a storage device or cause the information to be sent through a communication channel.

Figure 8:
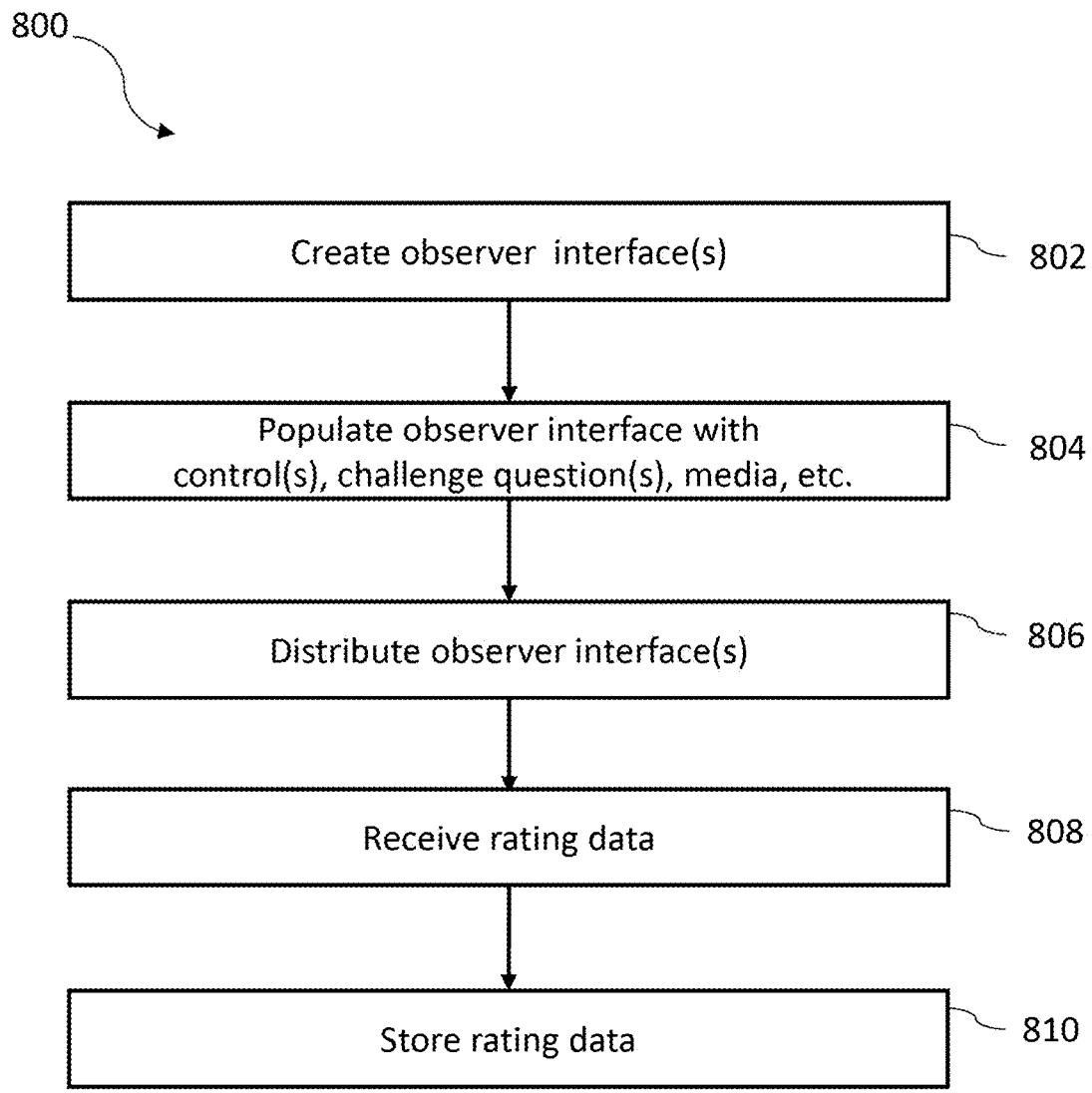
FIG. 8 is a flow-diagram of an implementation of a method to create and distribute observer interfaces in accordance with the present systems, devices, articles, and methods.

FIG. 8 shows a method 800 where data is collected from one or more observers. Those of skill in the art will appreciate that other acts may be included, removed, and/or varied to accommodate alternative implementations. Method 800 is described as being performed by a server, such as, server 1106 described herein below. However, method 800 may be performed by another agent.

At 802, the server creates or generates one or more observer interfaces. An observer interface allows an observer to provide information on the appropriateness or suitability of a robot in a scenario, or performance of a robot at a task. For example, the observer interface accepts a response (e.g., answer, prediction, rating, or score) from the observer.

At 804, the server fills the observer interface with control(s), challenge question(s), media, etc. For example, the observer interface includes an input portion and the input portion includes a binary input for a control mode representing human operator or machine operator. In some examples, the observer interface includes challenge questions like "Would you let this robot in your home?" and "Is this robot friendly?" Further examples of questions include "How complex or authentic is this robot's interactions?" and "Could you work alongside this robot?" The relative order of act 802 and act 804 varies with implementation.

At 806, the server distributes the observer interface(s) to one or more observers. At 808, the server receives data from the one or more observer interfaces. At 810, the server stores the data. In some implementations, the server returns the data. In some implementations, the controller generates a signal including information that represents the data. The controller may uses the signal to store the information in a storage device or cause the information to be sent through a communication channel.

Method 800 ends. In some implementations, processing continues with creation of a metric, for example, at 510 in method 500 of FIG. 5. In some implementations, the server generates a plurality of challenge questions for an observer agent. An observer interface may present these. In some implementations, the server computes a plurality of values for a plurality of metrics for a robot based on the collected data from the observer agent. In various embodiments, the challenge questions map to the plurality of metrics.

Figure 9:
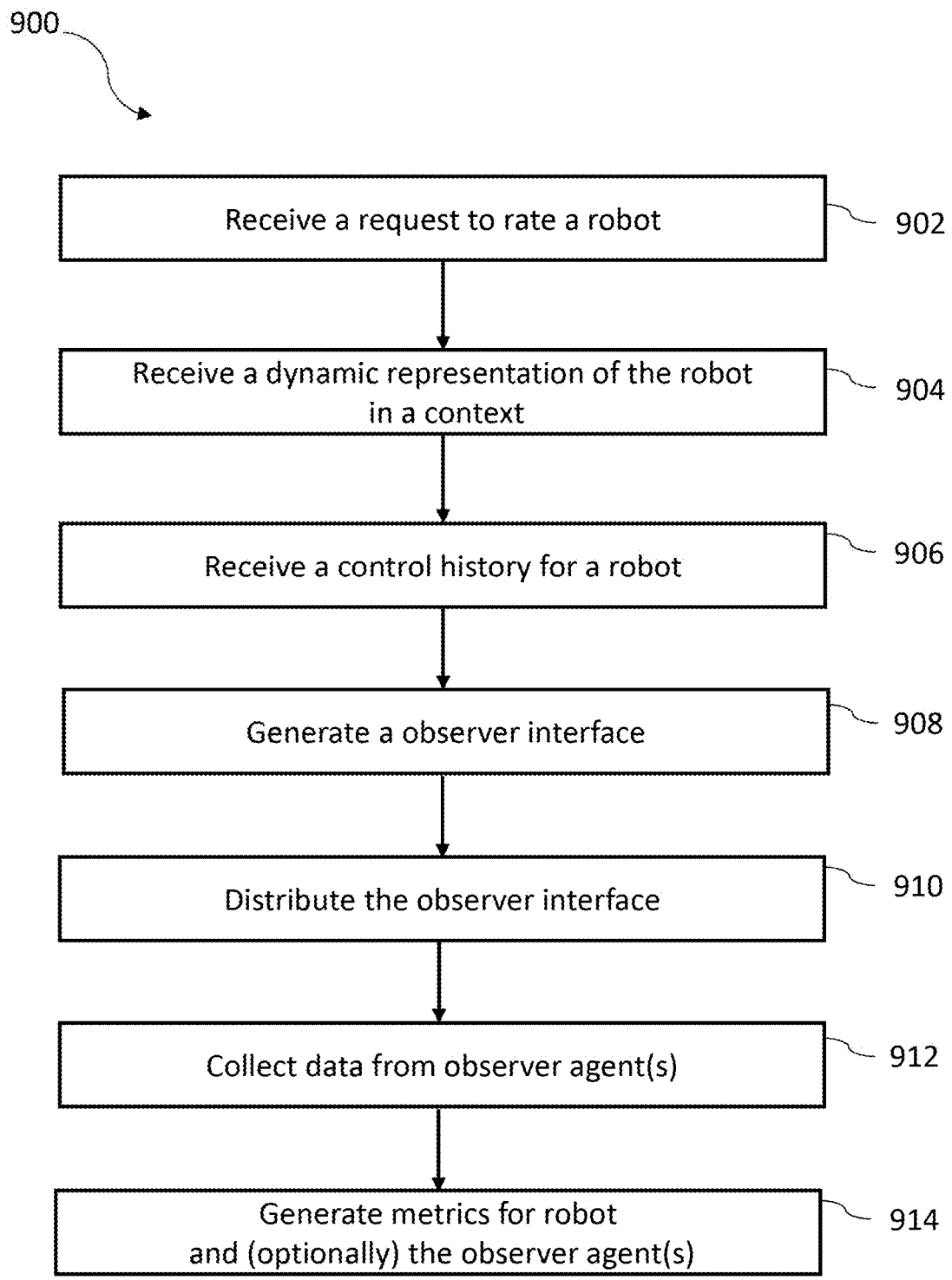
FIG. 9 is a flow-diagram of an implementation of a method of operation for a computer server to collect and aggregate data in accordance with the present systems, devices, articles, and methods.

FIG. 9 shows a method 900 that implements a routine to process a request to collect data on a robot associated with a remote system. Those of skill in the art will appreciate that other acts may be included, removed, and/or varied to accommodate alternative implementations. Method 900 is described as being performed by a server, for example, server 1106 described herein below. However, method 900 may be performed by another agent.

At 902, a computer server receives a request to rate a robot. For example, a remote system wants to receive an assessment of a robot. At 904, the server receives a dynamic representation of the robot performing a task, or behaving within a context or scenario. For example, server receives a media feed. The media feed could depict, for example, a robot looking at a photograph and exclaiming "Sure Walker Evans' images are stark, but they are beautiful." The robot may be reading and exclaim, "Honestly, the odd Mavis Gallant story in the New Yorker is all the Canadian content I can handle." The robot could be juggling a soccer ball with its knees and feet.

At 906, the server receives a control history for the robot. That is, the server learns of the control mode of the robot during the task, scenario, or context. This control history can be authenticated through hashing and public key digital signatures. Act 906 does not need to occur before acts 908-912.

At 908 the server generates one or more observer interfaces. Examples of observer interfaces are shown and described herein at, at least, FIGS. 1 and 13.

At 910 the server distributes the one or more observer interfaces to one or more observers. The server, at 912, collects data form the one or more observers via the one or more observer interfaces. At 914 the server generates or creates metrics for the one or more robots. For example, an aggregate of the assessment of the one or more observers on the performance of the robot at a task. Some metric aggregate other metrics or sub-metrics. In some implementations, the server computes a metric or measure for the one or more observers. For example, the accuracy of the observers given the control mode. Examples of metrics on the performance of observer are disclosed herein.

Figure 10:
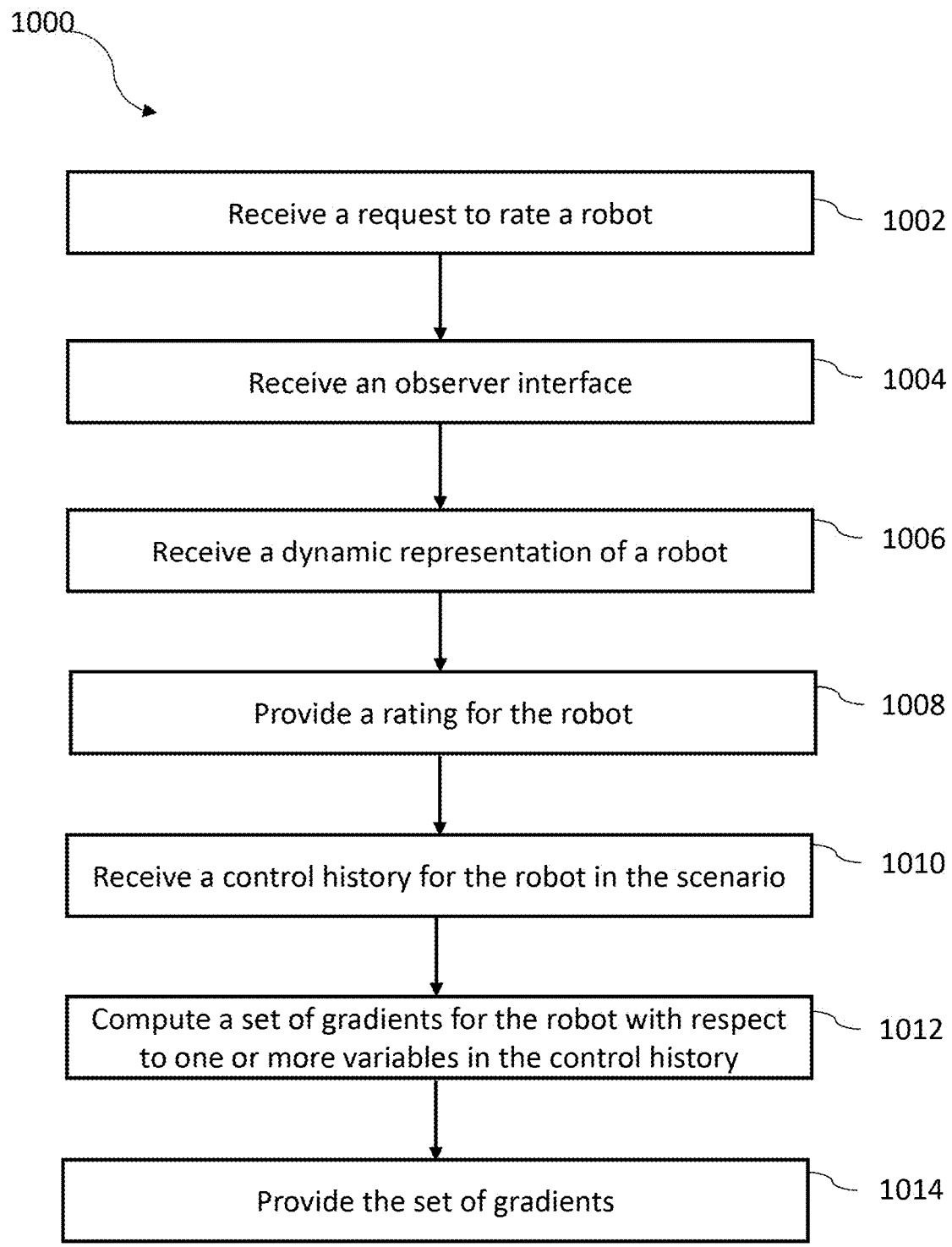
FIG. 10 is a flow-diagram of an implementation of a method of operation for a computer server to rank observers, machines, or operators in accordance with the present systems, devices, articles, and methods.

FIG. 10 shows a method 1000 that implements the maintaining a system of observers. Those of skill in the art will appreciate that other acts may be included, removed, and/or varied to accommodate alternative implementations. Method 1000 is described as being performed by observer, for example, processor-based device 182, or a part thereof. In some implementations, method 1000 is described as being performed by control subsystem 203 or processor(s) 204. However, method 1000 may be performed by another agent.

At 1002, the observer receives a request to rate a robot within a context or scenario, at a task, or the like. At 1004, the observer receives an observer interface. At 1006 and in some implementations, the observer receives a dynamic representation of a robot in a scenario or a context. In some implementations, the observer receives a dynamic representation of the robot performing a task.

At 1008, the observer provides data characterizing or representing a rating for the robot within the context, scenario, or the like. In some implementations, the data characterizing or representing a rating for the robot within the context, scenario is stored as an annotation of the dynamic representation of a robot. In some implementations, method 1000 ends after 1008.

At 1010, the observer receives a control history for the robot within the context, scenario, or the like. The control history includes a plurality of variables with changing values over time, e.g., time series, and characterizes the control mode of the robot.

At 1012, the observer computes a set of gradients for the robot with respect to one or more variables in the control history. At 1014, the observer provides, e.g., stores, displays, or returns, the set of gradients. Thus, a robot can improve by changing one or more variables in the control history.

Figure 11:
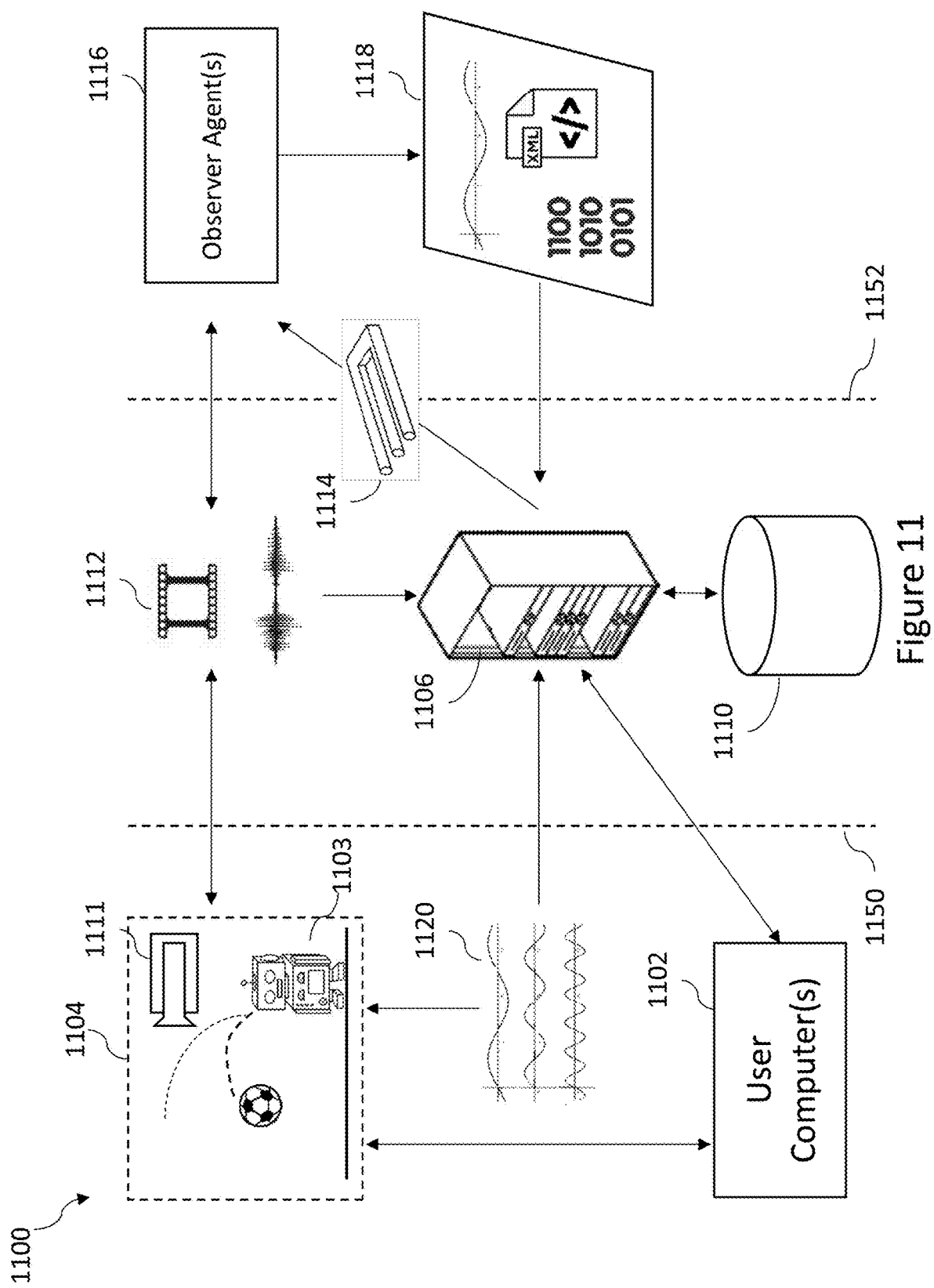
FIG. 11 is a schematic diagram illustrating a portion of a system including distributed users, a computer server, and one or more observers in accordance with the present systems, devices, articles, and methods.

FIG. 11 is a schematic diagram illustrating a portion of a system 1100 including one or more users, a server, and one or more observers. One or more user computer systems 1102 are associated with an environment 1104 within which a robot performs a task, or behaves within a context. One or more user computer systems 1102 are in communication to a server 1106. In some implementations, the server 1106 and a storage device 1110 in communication with each other. The server is in communication with one or more observers 1116, e.g., across a network.

The one or more users associated with user computer systems 1102 are desirous of receiving a rating for one or more robots. Via the user computer systems 1102, the user(s) request the assistance of server 1106 to provide one or more ratings from one or more observers, e.g., observer(s) 1116. Server 1106 may maintain within storage device 1110 records of the one or more observers. Server 1106 includes processor executable instructions and/or data to contact the one or more observers.

User computer systems 1102 provide or define a dynamic representation of a robot in a context and/or performing the task 1112. An example of a dynamic representation includes media 1113 prepared by a camera or imager 1111 and/or a microphone (not shown). The server 1106 may store the a dynamic representation 1112 in storage device 1110. Server 1106 provides one or more observer interfaces 1114 to one or more observers 1116. Observer(s) 1116 provide data 1118 via the based on the one or more observer interfaces 1114, and the dynamic representation 1112. Examples of data 1118 include binary and self-descriptive data.

The server 1106 may receive from the user computer system(s) 1102 control mode data 1120. Examples of control mode data include annotations to the dynamic representation of a robot. For example, characterizing or describing the control mode of a robot over time. Examples of control mode data include a plurality of time series for a plurality of variables, and/or processor executable instructions for directing a robot to perform a task, or engage in a context.

The server 1106 aggregates data 1118 and/or compares data 1118 to control mode data 1120 provided by user computer systems 1102. In some implementations, server 1106 annotates the dynamic representation of a robot with data 1118.

In operation system 1100 can be regarded as a computing system with a selectable hybrid machine/human computing arrangement which advantageously and selectively involves humans to assist a computer to solve particular tasks more efficiently. In some implementations, system 1100 is hybrid machine/human computing arrangement at training time. In some implementations, system 1100 is hybrid machine/human computing arrangement at run time.

In some implementations, a network 1150 separates user computer system(s) 1102 from server 1106. In some implementations, server 1106 is separated from the one or more observers 1116 via a network 1152.

Figure 12:
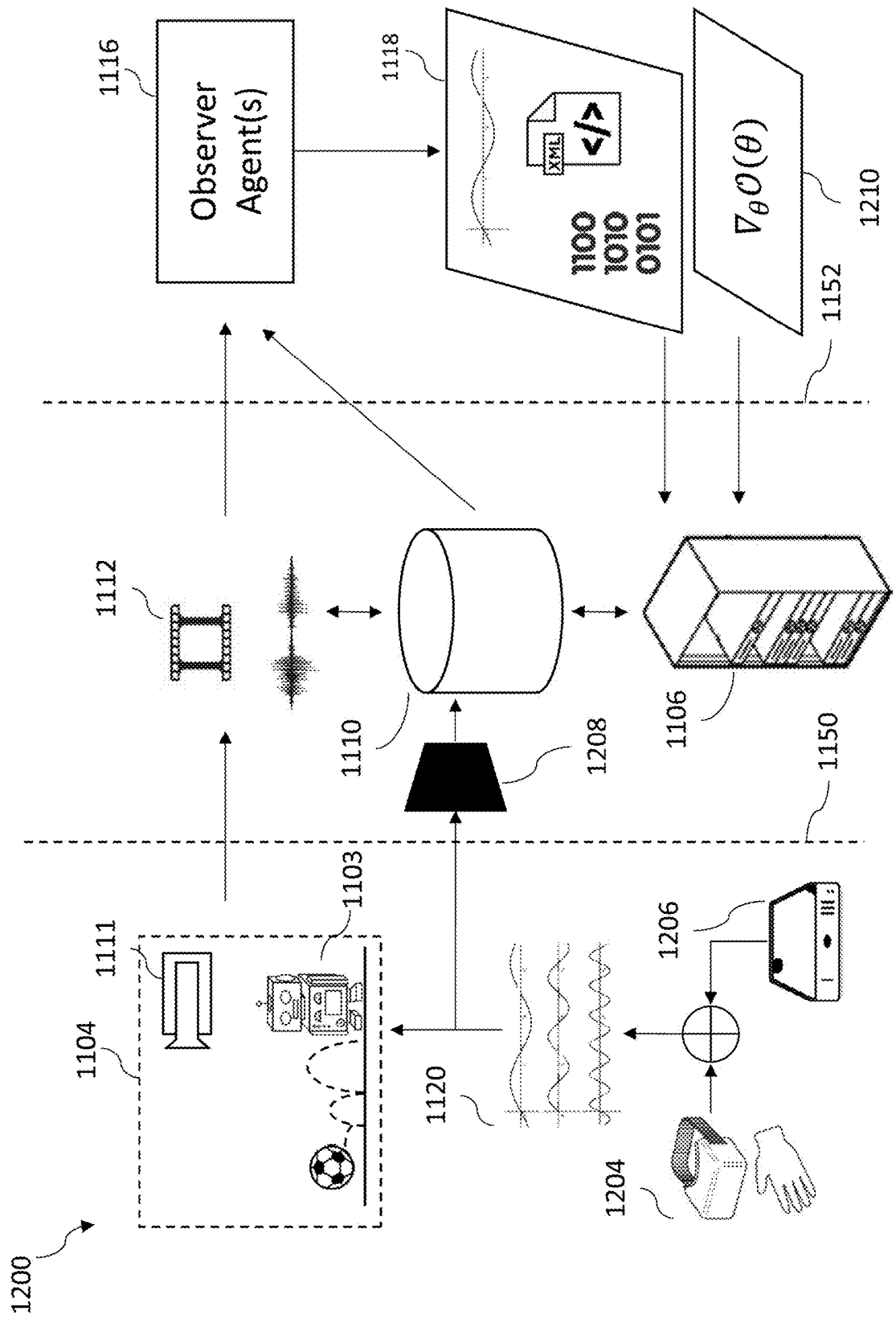
FIG. 12 is a schematic diagram illustrating a portion of a system including one or more users, servers, observers, and operators and/or machines in accordance with the present systems, devices, articles, and methods.

FIG. 12 is a schematic diagram illustrating a portion of a system 1200 including a user, a server, and one or more observers. System 1200 shares some components and arrangements with system 1100. A user computer system (not shown) is associated with environment 1104 within which a robot performs a task, or behaves within a context. A camera or imager 1111 captures the robot performing a task, or behaving within a context. In some implementations, a microphone captures sound for inclusion in media. Media, e.g., dynamic representation 1112, from the camera or imager 1111 is provided to a storage device 1110. In some implementations, a network 1150 separates the camera or imager 1111 from the storage device 1110. The dynamic representation can be stored in the storage device 1110 for later presentation.

In some embodiments, the robot is under the control of, or piloted by, a human operator at an operator interface 1204. In some embodiments, the robot is under the control of a processor-based device 1206 executing processor executable instruction. The human operator at an operator interface 1204 or processor-based device 1206 create a control history including one more time series. In some implementations, the control history is encrypted and/or marked for later authentication via encryption-authentication device 1208.

In some implementations, one or more user computer systems 1102 are in communication with a server 1106. In some implementations, the server 1106 is in communication with the storage device 1110. In some implementations, the server 1106 is communication with one or more observers 1116, e.g., via network 1152. In some implementations, the one or more observers 1116 are processor-executable instructions running on the server 1106.

In some implementations, one or more observers 1116 provide data 1118 based on dynamic representation 1112. Examples of data 1118 include binary and self-descriptive data. In some implementations, one or more observers 1116 receive control history, e.g., control mode history 1120 and provide data gradient information 1210 describing how a rating can be improved with respect to variables in the control history.

Figure 13:
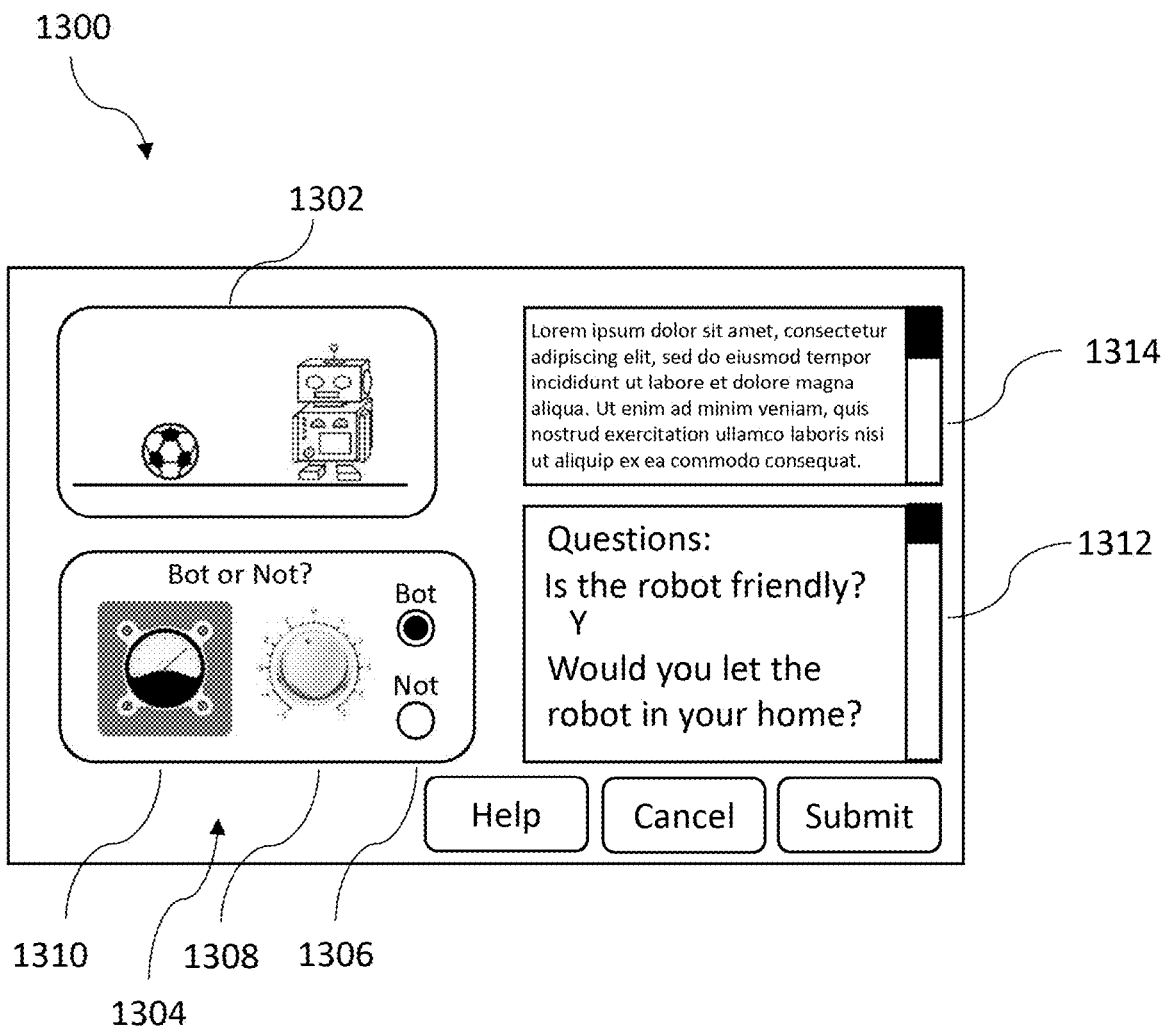
FIG. 13 is a wire frame diagram illustrating an observer interface in accordance with the present systems, devices, articles, and methods.

FIG. 13 is a wire frame diagram illustrating an observer interface or observer interface 1300. In some implementations, the observer interface is a graphical user interface (GUI). In some implementations, a controller presents interface 1300 to an observer. In some implementations, the interface is presented to both a human and an automated classification system. Thus, a double blind observation is possible with a controller providing a dynamic representation of a robot with an unknown control mode to either an observer, e.g., human observer or automated classification system.

Interface 1300 may include many standard features, for example, a menu bar 1304, minimize button, help button. Interface 1300 includes a dynamic representation 1302 of a robot in a context, scenario, at a task, or the like.

Interface 1300 includes an input interface 1304. In some implementations, input interface 1304 includes a binary input control 1306. A binary input control accepts from an observer a response (e.g., prediction or rating) as to the control mode of a robot. In some implementations, input interface 1304 includes knob 1308. Knob 1308 may be used by the observer to enter real or categorical input. For example, with real input knob 1308 accepts from the observer a guess, prediction, or rating as to the control mode of a robot and the degree of the prediction. Knob 1308 can be biased to spring back to a neutral input. In some implementations, input interface 1304 includes a display such as gage 1310. In s some implementations, the gage displays an aggregate value for a history of inputs. In some implementations, gage 1310 displays window of time input is accepted at input interface 1304.

In some implementations, interface 1300 includes a textual interface 1312. The observer answers questions via textual interface 1312. Examples of questions include challenge questions. Examples of questions include questions with binary and categorical responses. Examples of questions are disclosed herein. In some implementations, interface 1300 includes a text box 1314. Text box 1314 displays information to the observer, e.g., explanatory text.

A plurality of metrics and measures are proposed herein. Some metrics relate to the appropriateness of a robot within a context, in a scenario, or at a task. Some metrics relate to the intelligence of the robot. Some metrics or measures relate to the correctness of observers at predicting control mode.

In some implementations, a first metric is defined or selected in accordance with the following factors. For example, computer system 106 could select a metric from a plurality of metrics. If a dynamic representation of a robot starts and an observer immediately and correctly determines the control mode is machine, i.e., computer controlled robot, then outcome is a bad score. In some implementations, immediate assessment of machine control mode is the worst score. In some implementation, no assessment leads to the worst score. If time passes before the observer correctly determines that the control mode as machine, then the score should be good. If a lot of time passes and then the observer incorrectly rates the controller as human, the score is better still. When a short amount of time passes and the observer confidently vote for a human controller, then the score is better still. A good score could be high or low.

An exemplary first metric in view of these considerations is as follows. In some implementations, the first metric is an aggregate over a plurality of scores for one or more robots in one or more contexts. The score is a function of the prediction (i.e., observer data), and time. In some implementations, the score includes a first term, the absolute value of which, declines with time. In some implementations, the sign of the first term changes with response. An example score is:

$$s(t,G,M)=A+(-1)^{(G \wedge m)} B \exp(f(t)) \quad (1)$$

In this example of score, t is time, G is a prediction (e.g., a guess) (of an observer), and C is the control mode. Here A, B, and the details of function f are parameters. In some implementations, t is positive and real, while G and M are binary. The logic G∧M determines the sign on the second term of the equation. In a machine control mode, for a prediction of machine control mode (e.g., G=1 or bot), then second term is negative and decreases the score. For a prediction of human operator control mode (e.g., G=0 or not), then second term is positive and increases the score. For example, if a prediction is correct and the robot is in machine control mode (e.g., G=1 and M=1), then for certain parameters the value of the score is $50-100 \times 2^{(-1-t/10)}$. Conversely, the prediction is human operator control mode, then for the same parameters the value of the score is $50+100 \times 2^{(-1-t/10)}$. An example metric is an aggregation of scores, for example, over a set of contexts, c ∈ C. The first metric could be:

$$M1(C) = \sum_{c \in C} S_c \quad (2)$$

In some implementations, a metric is averaged over many observers and contexts. In some implementations, the metric is averaged over a plurality observers. In some implementations, the metric is averaged over a plurality of contexts, scenarios, or tasks, collectively contexts.

In some implementations, a metric is proportional to a probability that a robot in machine control mode rated as human in a particular context and normalized by a probability that the robot in human operator control mode is rated as human in that context. An exemplary second metric, ignoring gains, offsets, translations, calibrations, and corrections, is:

$$M2(\beta) = \sum_C \frac{E_{S(\beta,C)}[P(H \mid \beta, C)]}{E_{S(\psi,C)}[P(H \mid \psi, C)]} \quad (3)$$

In this example, H is a prediction of human operator, e.g., G=0; C is the context, scenario or task; S is a score for a dynamic representation of a robot in context C and a control mode; ψ is a human operator control mode; and β is a machine control mode. Here E is the expectation value operator, P(|) is a conditional probability, and the summation is over a set of contexts.

Some implementations use a metric including a difference score and a complexity score. In some implementations, a third metric includes a quantification of how similar an autonomous robot is to a human operated robot in the same context.

In some implementations, a complexity score is predefined for a plurality of scenarios and tasks. For example, a list of values associated with enumerated tasks that is distributed by a server.

In various implementations, the complexity score of the task is defined as being proportional to the number of bits of information provided into the lowest level of processor-executable learning instructions and/or data from the robot's sensor, motor, and action subsystems, collectively sensori-motor subsystems. This is equivalent to a logarithm of the total state space of possible sensori-motor configurations for the robot at any one time. For example, with a robot includes a sensor sub-system comprising two photo-detectors acting as rudimentary eyes the complexity is equal to the number of states for one of the two photo-detectors. If each photo detectors measures a single bit of information, e.g., 0 if the light level is low, and 1 if the light level is high, then the complexity score is two (2). The state space for the robot is proportional to the number of bits of information for a component in the sensori-motor subsystems raised to the power of the number of components. In this example, $2^2$ (4) which corresponds to the possible states of the system.

For another exemplary robot that includes sensori-motor subsystems comprising two photo-detectors and two DC-motor driven wheels the complexity is different. The wheels provide a simple forward-backward control. The complexity of the sensori-motor subsystems is now the sum of the bits of information each component. In this example, with two binary inputs and two outputs the complexity score is four (4). Here the total possible states are sixteen (16). The state-space of sensori-motor subsystems grows exponentially with the addition of further bits of sensori-motor information.

In some implementations, a difference score is collected from one or more observers. This score quantifies the difference between a human operator collected robot and a machine controlled robot. One or more observers provide data via an observer interface characterizing the behavior of a robot in a scenario under a first control mode. For example, a human operator control mode. The one or more observers then provide data via observer interface(s) on the robot in the scenario under a second control mode. The first and second control modes are different. In some implementations, the difference in the aggregate scores for each control mode is a value for the difference score for the robot-scenario. In some implementations, the aggregate of the differences of the scores for each control mode is the value for the difference score for the robot-scenario. The robot-scenario-control modes can be repeated and further data collected.

Some implementations use a third metric including a difference score and a complexity score. An example third metric is:

$$M3(D,X,C) \propto 1/(D(C) \cdot X(C)) \quad (4)$$

In this example, D(C) is a difference score for a context, C; and X(C) is the complexity score of the robot and context. The example of the third metric varies inversely with the product of difference and complexity scores. If the difference score is low the metric diverges to infinity. The complexity score normalizes the metric over different complexities. Alternatively, a bank of metrics one for each complexity value may be used.

In some implementations, a metric is averaged over many observers and contexts. In various implementations, a fourth metric including a difference score and a complexity score is an aggregated over two or more contexts. An example fourth metric is:

$$M4(D, X) \propto \sum_C M3(D, X, C) \quad (5)$$

In this example, the fourth metric is a summation of the exemplary third metric over a plurality of contexts.

If using the system herein to rank observers then systems, devices, articles, and methods herein may include a fifth metric or measure. The fifth metric correlates with the accuracy of the observer. The fifth metric has improved value for a correct prediction, and the opposite for an incorrect prediction. An example of the fifth metric is:

$$A(\{g_i\}, \{c_i\}, \{w_i\}) = (Z \cdot N)^{-1} \sum_{i=1}^{N} w_i (g_i - c_i)^2 \quad (6)$$

Here $\{g_i\}$ and $\{c_i\}$ are the set of predictions and control modes (i.e., predictions and actuals or truth) as indexed by i. An optional set of weights $\{w_i\}$ can be used to preferentially bias, e.g., discounting predictions from long ago. Here, Z is a normalization factor for the weights, such as, $$Z = \sum_{i=1}^{N} w_i.$$

The set of predictions can be binary, $g_i \in \{0,1\}$; pseudo binary, to avoid divide by zero errors, $g_i \in \{\epsilon, 1-\epsilon\}$, where $\epsilon$ is small real value; or continuous $g_i \in [\epsilon, 1-\epsilon]$. The set of control modes is binary. The lower the metric or measure of Equation 6 the better the observer is at predicting the control mode of a robot.

In some implementations, including where one control mode is more likely than another or there are more than two control modes, Equation 6 can be extended. This includes tracking the base rate, calibration, and resolution for two or more categories of predictions and control mode. For example, amongst various categories defined between terminal categories of bot and not, there could be a category of bot for voice and not for motion. An example of an extended fifth metric or measure is:

$$A = c(1-c) + N^{-1} \sum_{t=1}^{T} n_t (p_t - c_t)^2 + N^{-1} \sum_{t=1}^{T} n_t (c_t - c)^2 \quad (7)$$

Here c is the ratio of correct predictions to all N predictions, $n_t$ is the number of elements in a category t, $p_t$ is the probability of the category occurring, $c_t$ is the number correct for the category, and T is the number of categories. The first term is the base rate, the second is the calibration, and the third is the resolution of an observer.

In some implementations, a sixth metric includes collecting assessments from a plurality of observers and for a plurality of periods or bins. The collective assessment for each bin, called a sub-metric, is plotted against the plurality of bins. The sixth metric can include a value extracted from the plot or associated data structured used to create a plot. In some implementations, the sixth metric includes a lower bound on confidence interval on the ratio of Not votes to total Bot and Not predictions.

Metrics herein use an encoding question. The question "Bot-or-Not?" implies a convention Bot=1 and Not=0. However, various metrics may use the Not=1 and Bot=0 convention and question "Not-or-Bot?" The number of Not predictions is $n_+$. The number of Bot predictions is $n_-$. The total number of relevant predictions is $n=n_+ + n_-$. Also a control may update and refer to probabilities such as probability of Not, e.g., $p=n_+/n$.

Figure 14:
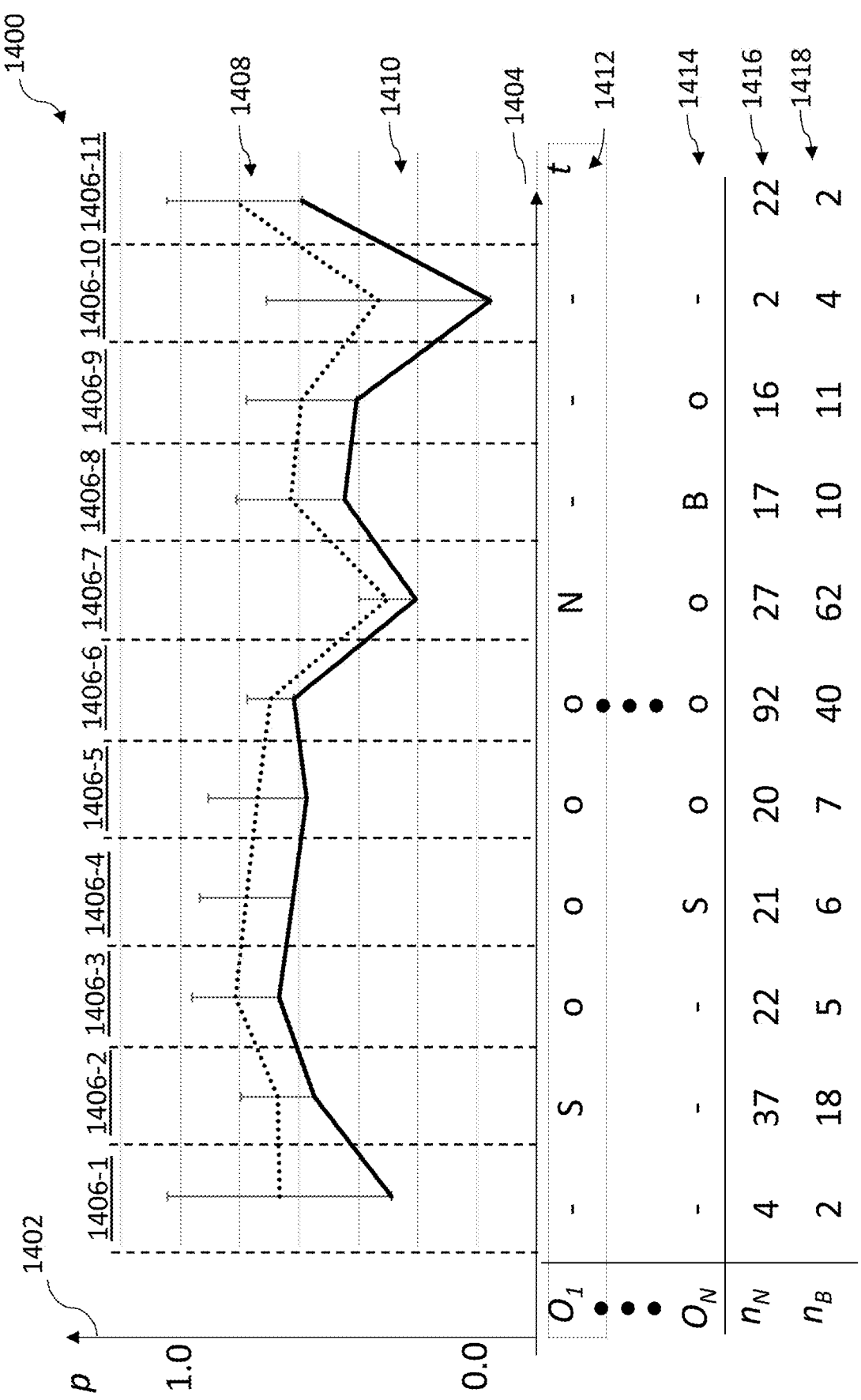
FIG. 14 is a schematic diagram a sub-metric plotted against time and an associated data structure in accordance with the present systems, devices, articles, and methods.

FIG. 14 shows a plot 1400 with two sub-metrics. Plot 1400 includes a probability axis 1402 against a time axis 1404. The time axis is a time index into a dynamic representation of a robot in a context, performing a task, and the like. A controller may present plot 1400 on a display. The controller divides or segments a dynamic representation of a robot in a context into a series of bins 1406. For example, bins of equal or approximately equal duration, e.g., bin 1406-1, bin 1406-2, etc. The controller collects predictions from a plurality of observers. The number of predictions for each bin can differ. The controller uses the predictions to create a sub-metric per bin. Plot 1400 includes a first sub-metric 1408 ranging between zero and one against axis 1402. Sub-metric 1408 includes error bars denoting the confidence interval for the sub-metric. Plot 1400 includes a second sub-metric 1410 that follows the lower extreme of the error bars for sub-metric 1408.

A first sub-metric could be a difference of positive responses $n_+$ and negative responses $n_-$. That is, Not predictions minus Bot predictions. However, if few observers provide predictions for a bin and that are consistently or mostly positive that bin's sub-metric will be lower than a bin with lots of predictions of differing values. A second possible sub-metric is the fraction of positive responses to total responses. However, bins with low response numbers, if positive, dominate. A third sub-metric is a hybridization of the first sub-metric and the second sub-metric that favors the former at low number of predictions and the latter at high number of responses. Such a sub-metric could include weighted linear combination of the first sub-metric and the second sub-metric where the weights are a function of total predictions per bin.

A fourth sub-metric assumes all collected predictions are samples from a statistical population of all predictions and thus includes a confidence interval. That is, if a controller were to ask every observer there would be a probability and a confidence interval will be zero. The sub-metric can be the sampled value, the sampled value along with the confidence interval, or a pessimistic or optimistic extreme of the sampled value and confidence interval combined. For example:

$$p \pm z(\alpha)\sqrt{\frac{1}{n}p(1-p)} \quad (8)$$

Here p is the percentage of positive responses, z is the $1-\frac{1}{2}\alpha$ quantile of a standard normal distribution, e.g., $\alpha=1.96$ then $z=1.96$. The pessimistic version of the fourth sub-metric is the negative branch of Equation (8). For example, sub-metric 1408 is the sampled value along with the confidence interval, and sub-metric 1410 is the pessimistic extreme of the sampled value. A fifth sub-metric could include the Wilson Interval Score for the confidence interval shown in Equation (8). Note sub-metric 1408 is about equal in bin 1406-3 and bin 1406-11 but sub-metric 1410 is unequal in the same bins with sub-metric 1410 higher in bin 1406-3.

Plot 1400 includes a representation of a data structure associated with a plurality of observers and bins. Shown are predictions from observers 1 through N, $O_1$ through $O_N$. Each observer starts viewing the dynamic presentation at a first bin and stops viewing at a second bin, e.g., in trace 1412 the first observer starts at bin 1406-2 and ends at bin 1406-7 with a guess of Not. In trace 1414 the last observer starts at bin 1406-4 and ends at bin 1406-9 and during bin 1406-9 makes a guess of Bot. The guess can be distributed over all of the bins the observer was presented with or just the bin for which the guess was made. The latter is shown.

The controller sums the number of Not predictions per bin (see trace 1416) and Bot predictions per bin (see trace 1418). The controller uses trace 1416 and trace 1418 to create sub-metric 1408 (ratio of Not predictions to all predictions), sub-metric 1410 (ratio of Not predictions to all predictions pessimistically biased per Equation (8)), or the like. The sixth metric could be the minimum value of a sub-metric over the bins 1406. That is the bin for which the collective guess is Bot. For example, sub-metric 1410 is minimal in bin 1406-10. The metric could be a summation of the area under sub-metric 1408 or the like. A response can be any of a prediction, a guess, a rating, a score, a reply, etc.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure. For example, those skilled in the relevant art can readily create source based on the flowcharts of the figures herein, including FIGS. 5-10, and the detailed description provided herein.

As used herein processor-executable instructions and/or processor-readable data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/ or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary or desirable, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. application Ser. No. 15/365,527, filed Nov. 30, 2016 are incorporated herein by reference, in their entirety.

The invention claimed is:

1. A method of assessing qualities of a robot, comprising:
causing, by a processor, a robot to perform a task in an environment;
capturing, by a camera coupled to the processor, media data of the robot performing the task in the environment, the media data including a video feed;
generating, by the processor, a dynamic representation of the robot performing the task in the environment from the captured media data;
providing, by the processor, the dynamic representation of the robot performing the task in the environment to an observer agent;
requesting, by the processor, a judged level of behavior of the robot, to be input by the observer agent;
receiving the judged level of behavior of the robot from the observer agent, wherein the judged level of behavior of the robot is determined by the observer agent observing the dynamic representation of the robot performing the task in the environment; and
training a machine learning model using the judged level of behavior of the robot.

2. The method of claim 1, wherein the captured media data includes an audio feed.

3. The method of claim 1, further comprising, distributing, by the processor, an interface for the observer agent.

4. The method of claim 3, wherein the interface is configured to accept input from a touch display, a mouse, a keyboard, or a virtual reality device.

5. The method of claim 1, further comprising, receiving by the processor, from the observer agent, a score derived from the judged level of behavior.

6. The method of claim 1, wherein the observer agent considers at least one of an intelligence, motion, or action to determine the judged level of behavior.

7. The method of claim 1, wherein the task is a grasping maneuver.

8. A method of assessing qualities of a robot, comprising:
causing, by a processor, a robot to perform a task in an environment;
capturing, by a camera coupled to the processor, media data of the robot performing the task in the environment, the media data including a video feed;
generating, by the processor, a dynamic representation of the robot performing the task in the environment from the captured media data;
providing, by the processor, the dynamic representation of the robot performing the task in the environment to an observer agent;
generating, by the processor, a question for the observer agent, wherein the question relates to the appropriateness of the robot's behavior in performing the task;
receiving, by the processor, an answer to the question from the observer agent, wherein the answer is determined by the observer agent observing the dynamic representation of the robot performing the task in the environment; and
training a machine learning model using the received answer.

9. The method of claim 8, wherein the captured media data includes an audio feed.

10. The method of claim 8, further comprising, distributing, by the processor, an interface for the observer agent.

11. The method of claim 10, wherein the interface is configured to accept input from a touch display, a mouse, a keyboard, or a virtual reality device.

12. The method of claim 8, wherein the appropriateness of the robot's behavior is determined in relation to at least one of the environment and the task.

13. The method of claim 8, wherein the task is a grasping maneuver.

14. A system of assessing qualities of a robot, comprising:
a robot configured to perform a task in an environment;
a camera configured to capture media data of the robot performing the task in the environment, the media data including video data;
a processor communicatively coupled to the robot and the camera, the processor configured to generate a dynamic representation of the robot performing the task in the environment from the captured media data;
an observer agent communicatively coupled to the processor, the observer agent configured to receive the dynamic representation from the processor; and
an interface coupled to the observer agent, wherein the interface is configured to display a request to input a judged level of behavior of the robot by the observer agent,
wherein the judged level of behavior of the robot is determined by the observer agent observing the dynamic representation of the robot performing the task in the environment, and wherein the judged level of behavior of the robot is used to train a machine learning model.

15. The system of claim 14, wherein the captured media data includes an audio feed.

16. The system of claim 14, wherein the interface is a coupled to a web service.

17. The system of claim 14, wherein the interface is configured to accept input from a touch display, a mouse, a keyboard, or a virtual reality device.

18. The system of claim 14, wherein the judged level of behavior is related to a level of friendliness of the robot.

19. The system of claim 14, wherein the observer agent considers at least one of an intelligence, motion, or action to determine the judged level of behavior.

20. The system of claim 14, wherein the task is a grasping maneuver.

* * * * *